US011341605B1

(12) United States Patent
Singh et al.

(10) Patent No.: US 11,341,605 B1
(45) Date of Patent: May 24, 2022

(54) DOCUMENT RECTIFICATION VIA HOMOGRAPHY RECOVERY USING MACHINE LEARNING

(71) Applicant: Amazon Technologies, Inc., Seattle, WA (US)

(72) Inventors: Kunwar Yashraj Singh, Redmond, WA (US); Amit Adam, Bellevue, WA (US); Shahar Tsiper, Haifa (IL); Gal Sabina Star, Haifa (IL); Roee Litman, Petach-Tikva (IL); Hadar Averbuch Elor, Ra'anana (IL); Vijay Mahadevan, San Francisco, CA (US); Rahul Bhotika, Bellevue, WA (US); Shai Mazor, Pinyamina (IL); Mohammed El Hamalawi, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/588,503

(22) Filed: Sep. 30, 2019

(51) Int. Cl.
   *G06T 3/00* (2006.01)
   *G06T 1/20* (2006.01)
   *G06T 3/60* (2006.01)
   *H04L 67/02* (2022.01)

(52) U.S. Cl.
   CPC ............. *G06T 3/0056* (2013.01); *G06T 1/20* (2013.01); *G06T 3/60* (2013.01); *H04L 67/02* (2013.01)

(58) Field of Classification Search
   CPC ........... G06T 3/0056; G06T 1/20; G06T 3/60; H04L 67/02
   See application file for complete search history.

(56) References Cited

U.S. PATENT DOCUMENTS

| 9,239,961 | B1* | 1/2016 | Cole | G06K 9/00456 |
|---|---|---|---|---|
| 9,355,312 | B2* | 5/2016 | Amtrup | G06K 9/00456 |
| 9,384,551 | B2* | 7/2016 | Ramaswamy | G06T 7/85 |
| 9,607,366 | B1* | 3/2017 | Brailovskiy | G06T 5/009 |
| 2011/0212717 | A1* | 9/2011 | Rhoads | G06F 16/9554 |
| | | | | 455/420 |
| 2013/0094764 | A1* | 4/2013 | Campbell | G06K 9/32 |
| | | | | 382/199 |
| 2014/0300704 | A1* | 10/2014 | Ramaswamy | G06T 7/85 |
| | | | | 348/48 |

(Continued)

OTHER PUBLICATIONS

Nibali, Aiden, et al.; "Numerical Coordinate Regression with Convolutional Neural Networks", La Trobe University Australia, May 3, 2018, arXiv:1801.07372v2, 10 pages.

(Continued)

*Primary Examiner* — Michael Le
(74) *Attorney, Agent, or Firm* — Nicholson De Vos Webster & Elliott LLP

(57) ABSTRACT

Techniques for document rectification via homography recovery using machine learning are described. An image rectification system can intelligently make use of multiple pipelines for rectifying document images based on the detected type of device that generated the images. The image rectification system can provide high-quality rectifications without requiring human cooperation, multiple views of the document in multiple images, and/or without being constrained to only be able to process images from one source context.

20 Claims, 11 Drawing Sheets

(56) References Cited

U.S. PATENT DOCUMENTS

| | | | |
|---|---|---|---|
| 2015/0071549 A1* | 3/2015 | Chajed | G06K 9/3275 |
| | | | 382/199 |
| 2016/0275374 A1* | 9/2016 | Zhu | G06K 9/6267 |
| 2017/0161640 A1* | 6/2017 | Shamir | G06N 20/00 |
| 2017/0193387 A1* | 7/2017 | Lavallee | G06F 16/3329 |
| 2018/0024974 A1* | 1/2018 | Welinder | G06K 9/4604 |
| | | | 715/229 |
| 2018/0121825 A1* | 5/2018 | Kumar | G06N 20/00 |
| 2019/0370539 A1* | 12/2019 | Shimamura | H04N 1/3873 |
| 2020/0228604 A1* | 7/2020 | Wang | H04L 67/14 |

OTHER PUBLICATIONS

"Image Gradients", OpenCV Open Source Computer Vision, downloaded from https://docs.opencv.org/3.1.0/d5/d0f/tutorial_py_gradients.html on Sep. 30, 2019, 3 pages.

* cited by examiner

DOCUMENT RECTIFICATION VIA HOMOGRAPHY RECOVERY USING MACHINE LEARNING

BACKGROUND

Hand-held cameras and smartphones have become an integral part of our life today. With the ubiquity of these devices, they are increasingly used to take pictures of documents such as contracts, checks, receipts, tax forms, and the like. However, these images typically have perspective distortion of the document and arbitrary backgrounds, making it difficult to perform advanced types of document analysis such as optical character recognition (OCR).

Further, images captured using hand-held devices in real world conditions tend to be significantly different than those captured using dedicated hardware (such as optical scanners) in controlled environments, due to the challenging photometric and geometric transformations these images undergo in regular day-to-day environments. In scenarios dealing with both types of captured image data, existing systems for perspective correction either completely fail or exhibit extremely poor performance. As a result, if these images are not corrected manually, these errors can lead to failure of the overall document analysis pipeline. As a result, current solutions therefore use interactive "manual" stages, such as by requiring a user to explicitly select the four corners of the document in the image, to allow for the document to be rectified before further processing occurs.

BRIEF DESCRIPTION OF DRAWINGS

Various embodiments in accordance with the present disclosure will be described with reference to the drawings, in which.

DETAILED DESCRIPTION

Figure 1:
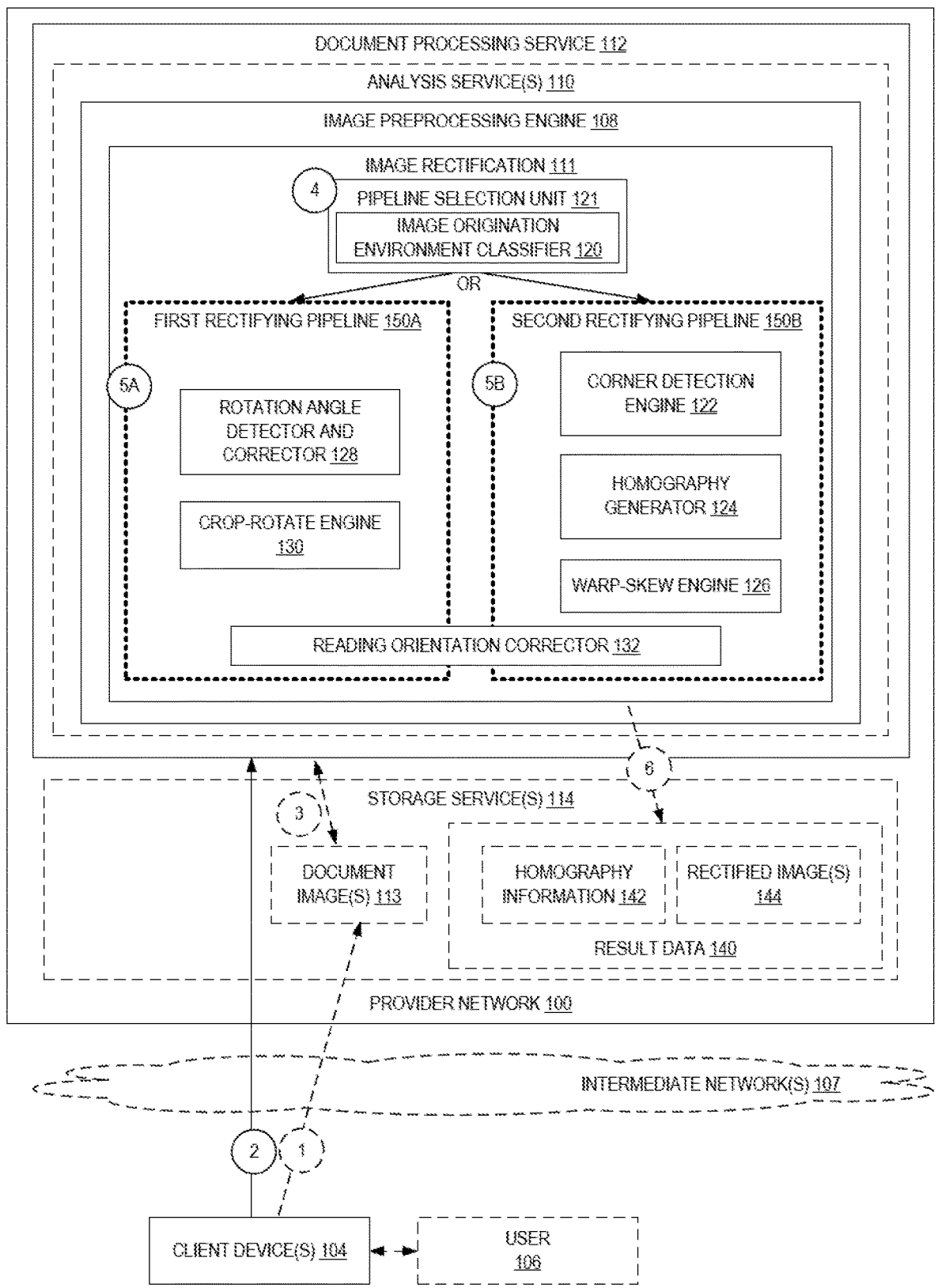
FIG. 1 is a diagram illustrating an environment for document rectification via homography recovery using machine learning according to some embodiments.

The present disclosure relates to methods, apparatus, systems, and non-transitory computer-readable storage media for document rectification via homography recovery using deep convolutional neural networks. According to some embodiments, an image rectification system can perform high-quality image rectification of images taken of documents regardless of whether the images were captured in controlled environments by special-purpose scanning hardware or "in the wild" by mobile devices such as smartphones, point-and-shoot cameras, tablets, and the like. Moreover, embodiments can perform this high-quality image rectification without requiring human assistance (e.g., the cooperation or assistance of a user capturing the image), controlled image acquisition environments, or the use of multiple images capturing a same document. In some embodiments, the image rectification system utilizes a first type of machine learning (ML) model to detect what type of device captured an image—e.g., a dedicated scanner versus a smart phone—and can thereafter utilize a different set of image preprocessing operations (or, processing pipelines) based on the type of capturing device to customize the rectification preprocessing to the type of image, resulting in high-quality rectification for multiple different types of captured images.

In some embodiments, the image rectification system may utilize a first pipeline for images captured by a first type of device, e.g., devices that typically provide inconsistent-quality image captures that often are taken under a variety of lighting conditions, at different angles and/or different distances from a captured document, with differing backgrounds, and the like. The first pipeline may include utilizing another ML model to detect locations within the image corresponding to the corners of the document represented therein, and these corner locations can be used to compute homography information indicating the particular orientation of the document within the image. Using the homography information, the pipeline may include rotating and/or warping the image (or portions thereof) to make the document "upright"—e.g., with a top-left corner of the document approximately (or exactly) directly above the bottom-left corner (on the y-axis) and the top-left corner of the document on an approximate (or exact) same horizontal plane as the top-right corner of the document. The pipeline in some embodiments also includes utilizing another ML model to detect an orientation of the document, which may be right-side up (and thus requiring no rotation) or may be at a 90, 180, or 270 degree orientation (and thus requiring a corresponding rotation to make the document properly aligned (e.g., with English language documents, having the text begin at the top-left and flowing from left to right).

In some embodiments, the image rectification system may utilize a second pipeline for images captured by a second type of device, e.g., devices providing consistent, high-quality image captures such as document scanners, which can provide consistent, evenly lit images captured at optimal angles and distances with a common background. The second pipeline may include determining an optimal rotation angle such that when the image is rotated at this angle the text is as close to perfectly-horizontally (and/or vertically, for example, depending upon the language of the text) aligned as is possible. Based on this angle, simplified homography information in the form of bounding area (e.g., bounding box) data can be generated and used to crop and/or rotate the image to make the document more aligned. The second pipeline may also include detecting the orientation of the document (e.g., as described with regard to the first pipeline) and performing any necessary correctional rotations as needed.

In some embodiments, the rectified image generated by either of these pipelines may be used with other optical character recognition (OCR) based processes, which will be able to generate high-quality results due to nearly any type of document capture image being rectified to be properly aligned. These results may be persisted and/or provided to another processing system or a requesting user. The detected homography information may also be used to generate a bounding area representation corresponding to the original image to indicate where the system detected the document, allowing the end user to adjust their trust of the system according to the quality of the document detection area.

FIG. 1 is a diagram illustrating an environment for document rectification via homography recovery using machine learning according to some embodiments. In FIG. 1, an image rectification 111 system operates as part of an image preprocessing engine 108 of a document processing service 112. The image rectification 111 system, image preprocessing engine 108, and/or document processing service 112 may be implemented as software that is executed by one or multiple computing devices. As one example, in FIG. 1, the document processing service 112 may be a "service" provided by a provider network 100.

A provider network 100 (or, "cloud" provider network) provides users, such as user 106, the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service 114 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 107 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As indicated above, when attempting to process documents represented within document images (e.g., files such as GIF, JPEG, PNG, RAW, PDF, etc., which may also be referred hereto as just images or the like) to identify text and/or other elements present in the documents, it is imperative to rectify these document images—whether captured from mobile devices or scanners—to align and cropped them properly. In particular, rectifying images to correct even minimal amounts of rotation and/or skew is hugely important and leads to significantly improved results with such rectified images, as most OCR engines rely on machine learning models that have been trained on "clean" data that does not have such distortions.

For example, mobile captures typically have a perspective distortion from the phone's camera, and thus it is hard for processing systems that are commonly trained using images without any perspective distortion or with different perspective distortions to infer text from those images. Thus, it is tremendously helpful to rectify these images to remove the perspective distortion, to result in an image providing a bird's eye view of the document that can more easily be processed using automated techniques. Similarly, many of these images have noisy backgrounds due to the captures taking place in a huge number of locations, such as on top of a textured countertop, on top of a wooden table, held out into the air in front of the lens by the photographer, etc. Such noisy backgrounds also create difficulties for automated processes for similar reasons.

However, at the same time it may also be imperative for such a system to be able to properly process documents that have been scanned using devices such as document scanners that produce comparatively high-quality scans. Embodiments of the image rectification 111 system described herein can handle document images from multiple different sources and environments.

Moreover, many existing systems have extremely constrained working scenarios. As one example, a bank or financial institution may provide a mobile application to allow users to scan checks. However, these apps typically take multiple photos of a same document, and as a result it is relatively easy to do mathematical transforms to align. However, this may be not practical or doable in many real-world scenarios. Further, these apps may display a bounding box overlaid on the camera's subject and the app forces its users to put the check within that box, or the app may force users to annotate/select the corners of the document being captured. Thus, there is manual effort required on users to provide good input, which again is not possible in all scenarios. Further, these systems have a constrained application and thus are designed with a complete understanding of what the users are taking a picture of—e.g., a check—and thus the system knows what types of fields exist, where they should be located, what general size they should be, and so forth, which aids in processing. In contrast, embodiments can perform high-quality rectification based on just a single image, however captured, including possibly infinite types of documents, and without manual effort on the part of the human user. Further, embodiments can run asynchronously on huge numbers of documents and can support bulk processing, whereas other processing systems cannot scale.

As described further herein, the image rectification 111 system may include multiple software components executed by one or more computing instances by one or more computing devices. The image rectification 111 system may include a pipeline selection unit 121, a corner detection engine 122, a homography generator 124, a warp-skew engine 126, a crop-rotate engine 130, a rotation angle detector and corrector 128, and/or a reading orientation corrector 132, any of which may be implemented as a software module executed by one or multiple computing devices (e.g., server computing devices) at one location (e.g., within a rack or set of computing devices in a same room or building) or multiple locations (e.g., within multiple rooms or buildings at one or multiple geographic locations—potentially across numerous cities, states, countries, or continents). These elements of the system may rely upon a set of data structures (e.g., queues, database tables, flat files, etc.) implemented within the system or provided by other components (e.g., other services). However, these data structures may be consolidated (e.g., multiple ones of the structures can be implemented in a joint manner) or further expanded in other embodiments according to techniques known to those of skill in the art. In this example, the image rectification 111 system is implemented as part of a document processing service 112 of a provider network 100, though in other embodiments the image rectification 111 system may be implemented in other locations (e.g., within an application executed by a client device such as a mobile phone, within a non-multitenant system).

However, in this example, a user 106 via a client device 104 (or a client device 104 acting under the configuration of, or the benefit of, a user 106) may interact with the document processing service 112 to analyze document image files carrying representations of documents, e.g., to detect what text is represented within the document, to determine what type of document is represented, to detect particular values in the document, etc. A document image file may be a digital file storing a representation of a document, such as a form, receipt, letter, bank check, academic paper, etc. For example, a document image may be a Portable Document Format (PDF) file, an image including a representation of a document (e.g., a JPG, GIF, PNG)—which may have been captured by an optical sensor (or camera) of the client device 104, etc. Each document image file may include one or multiple "pages" of content, and each page may include one or multiple document "segments," where each segment may be thought of as a portion of a document including text arranged according to some common theme or arrangement.

The term "text" (or the like) may be used to refer to alphanumeric data—e.g., alphabetic and/or numeric characters, which may include Latin letters, Arabic digits, punctuation marks, symbols, characters from other character sets, etc. As one example, text may include Unicode characters (e.g., currently 137,439 characters covering 146 modern and historic scripts, as well as multiple symbol sets and emoji). Thus, the term text is to be understood broadly and is not meant to be limited to only "letter" characters unless otherwise indicated by the context of use.

Optionally, the user 106 may cause one or more document images 113 to be uploaded at circle (1) the document image 113 (e.g., a digital image) to a location that is distinct from the document processing service 112 at circle (1). For example, the user 106 may cause the electronic device 104 to send one or more document images 113 to be stored at a location of a storage service 114 within (or alternatively, outside of) the provider network 100. The storage service 114 may provide, in a non-illustrated response message, an identifier associated with the document image 113 files (e.g., a Uniform Resource Locator (URL) for the file, a unique identifier of the file within the context of the storage service 114 or provider network 100, a name of a folder (or storage "bucket" or group) that includes the file, etc.)

To analyze a document represented within an image file, a user 106 may utilize one or more API calls to the document processing service 112, which may be carried by HyperText Transfer Protocol (HTTP) request messages destined to an endpoint associated with the provider network 100 or document processing service 112, though in other embodiments the API calls may be made via function/procedure calls to a library that implements the document processing service 112, in which case the document processing service 112 may optionally be resident on the client device 104 (not illustrated) and thus, be locally invoked by client code. For example, an API call may be sent as a request at circle (2) to indicate to the document processing service 112 that the user 106 desires for analysis to be performed for one or multiple document images. In an asynchronous mode of operation, the document processing service 112 may respond with a "unique" (at least within a particular period of time in some particular context) job identifier (ID) in a response (to the request) that can later be used to poll for the job's status and/or obtain eventual results. In a synchronous mode of operation, the document processing service 112 may immediately analyze the document image and respond with the results of the analysis, which could include detected text, detected segments within the document, visual information such as a depiction of the original image with bounding boxes overlaid upon the document borders, text borders, segment borders, etc. In some cases, the document image data may be included within the API call shown at circle (2), or may be identified within this API call, such as when the document image(s) 113 are stored in a storage service 114 location. In the latter case, after receipt of the API call, the document processing service 112 may obtain the document image(s) 113 from the storage service 114, e.g., by sending a request to the storage service for the image(s) based on the provided identifier of the image (e.g., a full path/location of the image, or a folder/bucket storing that image), and receiving the transmitted document image (s) 113 in response.

To process the document image(s), the document processing service 112 may use Optical Character Recognition (OCR) type technologies to detect and/or identify text within the document image(s) 113. However, as indicated above, these systems are often inflexible to images captured from different types of devices and thus provide results of significantly varying quality for different types of these images. Accordingly, the document processing service 112 in some embodiments uses a set of analysis services 110 including an image preprocessing engine 108 to prepare the document images 113 such that later OCR-type analysis can provide high-quality results regardless of the source of the image(s) 113. In some embodiments, the image preprocessing engine 108 utilizes an image rectification 111 system to rectify the document images 113 by performing operations such as cropping, rotating, skewing, etc., the images so the documents can be analyzed with a consistent frame of reference—e.g., having substantially "square" document alignment within the image, with noisy background aspects removed or minimized, with the document being "right side up," and the like.

As part of preprocessing the document images 113, the document processing service 112 may invoke the image rectification 111 system (e.g., by sending a request to a compute instance at least partially implementing it, by issuing a function or method call, etc.) to rectify one or more document image(s) 113.

In some embodiments, at circle (4) a pipeline selection unit 121 of the image rectification 111 system utilizes an image origination environment classifier 120 to detect what type of device originally captured the document image. The image origination environment classifier 120 can comprise an ML model such as a neural network, support vector machine (SVM), or the like, that has been trained using labeled sample images indicating whether the images have been generated by a particular category or type of device (or generated by or within a particular type of image capture environment). As one example, the ML model may be trained to classify whether the document image was originated by a document scanner type device (or not), or trained to classify whether the document image was originated by a mobile type device (or not), or trained to predict what type of device generated the document image—e.g., professional document scanner, consumer document scanner, point-and-shoot camera, mobile device camera (such as from a smartphone or class of smartphones), Digital single-lens reflex cameras (DSLRs), or the like. Based on the origination device or environment inferred by the image origination environment classifier 120, the pipeline selection unit 121 can identify a pipeline from multiple pipelines 150A-150B is most-well suited to rectify the image and initiate the pipeline to perform that rectification.

In some embodiments, the ML model is trained using histogram information from one or more channels of the image. For example, histograms for the red, green, and blue channels of an image may be generated by the pipeline selection unit 121 (using techniques or software libraries known to those of skill in the art) and provided to the model during training (as well as during inference)—e.g., each histogram may be concatenated together into one large data value. This approach works because histograms of various channels tend to be skewed differently for mobile-captured images (e.g., due to background noise), whereas histograms from document scanners typically have a much more regular color consistency. As a result, a ML model can be trained to detect these skews and thus recognize the class/type of device that captured the document image.

As one of many possibilities, the ML model could be an SVM using a kernel function such as a polynomial kernel (e.g., of degree 1, 2, 3, 4, etc.) with a particular penalty (e.g., L1, L2, etc.). In machine learning, the polynomial kernel is a kernel function commonly used with SVMs and other kernelized models which represents the similarity of vectors (training samples) in a feature space over polynomials of the original variables, allowing learning of non-linear models. Thus, one implementation could provide a non-deep learning-based technique that works on histograms of input image channels to classify the document as being a scanned or mobile capture using a classifier such as an SVM (e.g., with a polynomial kernel), where the input to the SVM is based on the histogram of the input image for each of multiple channels (e.g., R/G/B, C/M/Y/K, etc.)

Based on the detected type of originating device, the image rectification 111 system may select a rectification pipeline 150 (or "rectifying pipeline") that is associated with that type of device from multiple possible pipelines. For example, the image rectification 111 system may utilize a first rectifying pipeline 150A for images determined to originate from a "scanned" environment (e.g., generated by a scanner device) and a second rectifying pipeline 150B for images determined to originate from other "in the wild" environments (e.g., generated by cellular phones, DSLRs, tablets, etc.). This configuration enables the image rectification 111 system to beneficially and quickly determine and apply the particular rectification procedures known to be most beneficial for images obtained from different device types.

For example, if at circle (4) the result of the image origination environment classifier 120 indicates that the originating device type was a first type (e.g., corresponding to a scanner device), the image rectification 111 system may select the first rectifying pipeline 150A at (5A) to rectify the image.

The first rectifying pipeline 150A includes a rotation angle detector and corrector 128. The rotation angle detector and corrector 128 may apply any of various techniques to identify an appropriate angle of the content within the cropped image, which may then be used to rotate the image to thus "straighten out" the document. As one example, in some embodiments the rotation angle detector and corrector 128 includes a software module that computes gradients (or derivatives) of the document image in the X and Y directions, allowing for a maximum agreeing angle to be determined. Such an example could be implemented using functionalities based on those provided by known computer vision libraries, such as the OpenCV library, which provides gradient filters that can be used to compute image gradients, which could include use of the Sobel, Scharr, or Laplacian operators. Using such a gradient-based technique, the rotation angle detector and corrector 128 can determine a rotation angle of the content of the document.

For example, in some embodiments the rotation angle detector and corrector 128 may implement a two-phase approach to find a maximum agreeing angle. In a first "coarse-grain" phase, the rotation angle detector and corrector 128 may compute gradients of the image in the X and Y directions at an original orientation, and then iteratively rotate the image, computing the X and Y gradients again after each rotation. In some embodiments, the rotation angle detector and corrector 128 may perform this iterative procedure at increments (e.g., one-degree increments, five-degree increments, or the like) between a range (e.g., from 0 degrees rotation to 90 degrees rotation). A sum of the X and Y gradients at each increment is generated, and at the conclusion of the iterative process a candidate maximum agreeing angle will correspond to that angle having the largest overall sum.

In some embodiments, the rotation angle detector and corrector 128 may then enter a "fine-grain" phase and again compute gradients around the candidate maximum agreeing angle, e.g., with smaller rotations above and/or below the candidate maximum agreeing angle. For example, if the candidate maximum agreeing angle was found to be 20 degrees and the iterative rotation size in the coarse-grain phase was 1 degree, the fine-grain phase could include gradient computation at 19.5 degrees and/or 20.5 degrees, or further/different gradient computation based on a search scheme (e.g., a binary search procedure or similar) until a maximum gradient sum is found. Upon finding the maximum gradient sum, the corresponding angle can be identified as the angle to rotate the image to align the document vertically.

The first rectifying pipeline 150A in some embodiments also includes a crop-rotate engine 130 that can analyze the document image and crop it to the size of the content and rotate the image using known image manipulation cropping or rotation techniques known to those of skill in the art. This crop and rotation may be based in whole or in part on the rotation angle determined by the rotation angle detector and corrector 128, which can be used to create a document bounding box around the content of the document, and the image may be cropped to this bounding box and rotated to make the content horizontally and vertically square.

The first rectifying pipeline 150A in some embodiments also includes the use of a reading orientation corrector 132 that can determine whether the document requires further rotation and if so, perform the rotation.

In some scenarios it may be the case that although the document has been rotated so that its top and bottom edges are horizontal and its side edges are vertical, it may be the case that the document remains rotated. For example, the document may be upside down (i.e., rotated 180 degrees from the typical alignment) or at a 90-degree or 270-degree misalignment.

The reading orientation corrector 132, in some embodiments, utilizes one or more ML models trained to classify the orientation of a document. For example, a neural network (such as a convolutional neural network (CNN)) can be trained to recognize documents that are in a typical alignment (e.g., at 0 degrees) or at other alignments (e.g., at 90, 180, or 270 degrees). Exemplary ML models for this task could be based on a well-known architecture such as AlexNet, ResNet, VGGNet, DenseNet, or the like.

In some embodiments, the being-rectified image is provided to the ML model at a particular resolution that is usually smaller than the original resolution, and thus may be resized to have a maximum dimension size being 1024 pixels in width and/or height while maintaining the original aspect ratio. The output of the ML model may be an identifier of the orientation, e.g., 0/90/180/270, or other values representing these orientations (e.g., 0/1/2/3). With the determined orientation, the reading orientation corrector 132 can then perform a rotation of the image according to the orientation so that it ends up being "properly" aligned at 0 degrees.

For other types of images originated by other types of devices, though, a different pipeline may be utilized that corrects defects more prevalent in those settings. For example, if at circle (4) the result of the image origination environment classifier 120 indicates that the originating device type was a second type (e.g., corresponding to non-scanner devices such as smartphones, consumer cameras, or the like), the image rectification 111 system may select the second rectifying pipeline 150B to rectify the image.

The second rectifying pipeline 150B, in some embodiments, includes a corner detection engine 122 that can detect the locations of the corners of a document within an image. This function is especially important for images captured in non-controlled environments, which tend to have perspective skew issues as well as inconsistent and atypical backgrounds and lighting conditions.

The corner detection engine 122 may include a ML model that is trained to identify corner locations of a document within an image and emit identifiers of the locations of these corners, e.g., using per-corner heatmaps to identify four particular corner locations. For example, the ML model may utilize a segmentation-type approach via a deep CNN trained to segment out the corners.

In some embodiments, a relatively small image of relatively small size (compared to the actual document image) may be used as input to the ML model. For example, the document image may be converted to sizes based on 256 pixels (absolute dimension sizes—such as a 256×256 RGB image—or as maximum dimensional size), 512 pixels, etc. This relatively small size may be purposefully selected to prevent the model from focusing on relatively minor defects common in these "in the wild" type image captures such as deformations, paper wrinkles, or the like that might confuse the model. Accordingly, by using a lower resolution input image the overall structure of the document is more strongly present, allowing the model to discern the overall shape of the document and the locations of its corners.

The model may output four channels (e.g., of 64×64 pixel resolution), where each channel may directly indicate a corresponding corner or provide a heatmap indicating predicted likelihood locations of the corresponding corner. The data of these channels—corresponding to upper-left corner, upper-right corner, bottom-left corner, and bottom-right corner—can be used to identify the corresponding four corners of the document within the large image using straightforward translation techniques.

The second rectifying pipeline 150B may also include a homography generator 124 that can use the channels from the corner detection engine 122 or the actual coordinates to generate rectifying homography information (e.g., projective transform data) associated with the orientation of the document within the image. The homography generator 124 may be implemented using known computer vision libraries that can generate homography data, e.g., using direct linear transforms to solve for the homography.

With this homography data, a warp-skew engine 126 of the second rectifying pipeline 150B can "correct" the image by warping, skewing, rotating, etc., the image to project the document into a proper 2D plane, making it upright.

This resulting image may also be fed to the reading orientation corrector 132 described herein as also being used in the first rectifying pipeline 150A, which can detect that the document remains misaligned (e.g., flipped) and correct the misalignment by making further rotations.

At the end of each pipeline 150, the image rectification 111 system may output result data 140 in the form of homography information 142 (or a simplified version thereof, such as bounding box coordinates indicating where the document lies within the original corresponding image) and the rectified image(s) 144 to one or more of a variety of locations. As one example, the image rectification 111 system may optionally store this result data 140 to a storage location of a storage service 114 at circle (6) where it may then be accessed by other users or applications, transmit this result data 140 directly to another system of the document processing service 112 (such as an OCR engine or other analysis service 110) for further processing to service the user's request, and/or transmit this result data 140 to a system outside the provider network (e.g., another storage service, to the client computing device, etc.). As one example, the rectified image and corresponding homography information may be passed to another document processing stage of the document processing service 112 (e.g., to detect text in the document), and the text may be presented back to the requesting user, optionally along with the original image with at least one bounding box overlaid thereupon based on the homography information that illustrates the borders of the document within the image.

Figure 2:
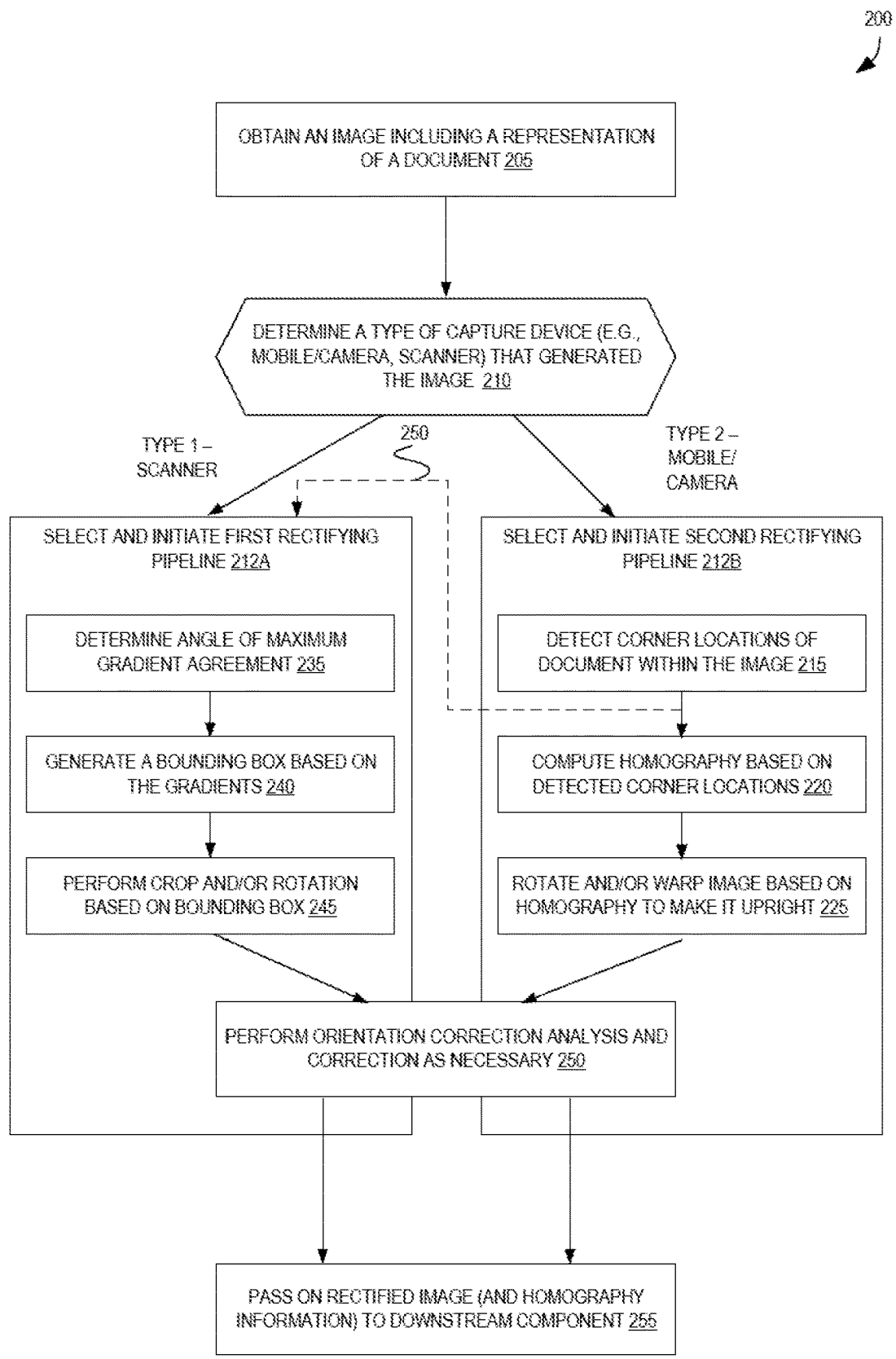
FIG. 2 is a flow diagram illustrating operations of a method for document rectification via homography recovery using machine learning according to some embodiments.

For further detail on exemplary rectification processing, FIG. 2 is a flow diagram illustrating operations 200 of a method for document rectification via homography recovery using machine learning according to some embodiments. Some or all of the operations 200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 200 are performed by the image rectification 111 system of the other figures.

The operations 200 include, at block 205, obtaining an image including a representation of a document. The obtaining may include sending a request to a storage service for the image and receiving the image back in response, where the request may include an identifier of the image provided by a user's document analysis request. The obtaining may alternatively include receiving image data directly within (or along with) a user's document analysis request. The image may have been originated by a variety of devices, including but not limited to document scanners to mobile phones to point-and-shoot cameras.

The operations 200 further include, at block 210, determining a type of capture device that generated the image. Block 210 may be performed by the image origination environment classifier 120 and include use of a ML model trained to infer the originating device type based on, for example, histogram data for each of a plurality of channels of the image.

In some embodiments, when block 210 determines that the image is of a first type corresponding to a document scanner, for example, the operations 200 further include, at block 212A, selecting and initiating a first rectifying pipeline to rectify the image that is for use with document scanner (or similar) originated images.

This first rectifying pipeline may include, at block 235, determining an angle of maximum gradient agreement. Block 235 may be performed by the rotation angle detector and corrector 128 and include generating gradients using a computer vision software module that computes gradients (or derivatives) of the document image in the X and Y directions. With the angle of maximum gradient agreement, block 240 includes generating a bounding box based on the gradients (e.g., by constructing a minimum polygon/box that bounds the detected gradients), and at block 245 performing a crop and/or rotation of the image based on the bounding box to rectify the document by effectively projecting it into a default 2D plane. The first rectifying pipeline may also include, at block 250, performing orientation correction analysis (e.g., using a ML model trained to detect the orientation of documents) and correction as necessary (e.g., rotating the image by 90 degrees counterclockwise when the ML model has determined that the image was rotated 90 degrees clockwise from the desired orientation.

In some embodiments, when block 210 determines that the image is of a second type corresponding to a non-document scanner such as a mobile device or camera, for example, the operations 200 further include, at block 212B, selecting and initiating a second rectifying pipeline to rectify the image that is for use with non-document scanner (or similar) originated images.

This second rectifying pipeline includes, at block 215, detecting corner locations of the document within the image, which may be performed by the corner detection engine 122 and include use of a ML model implementing a segmentation-type approach via a deep CNN trained to segment out the corners.

Figure 3:
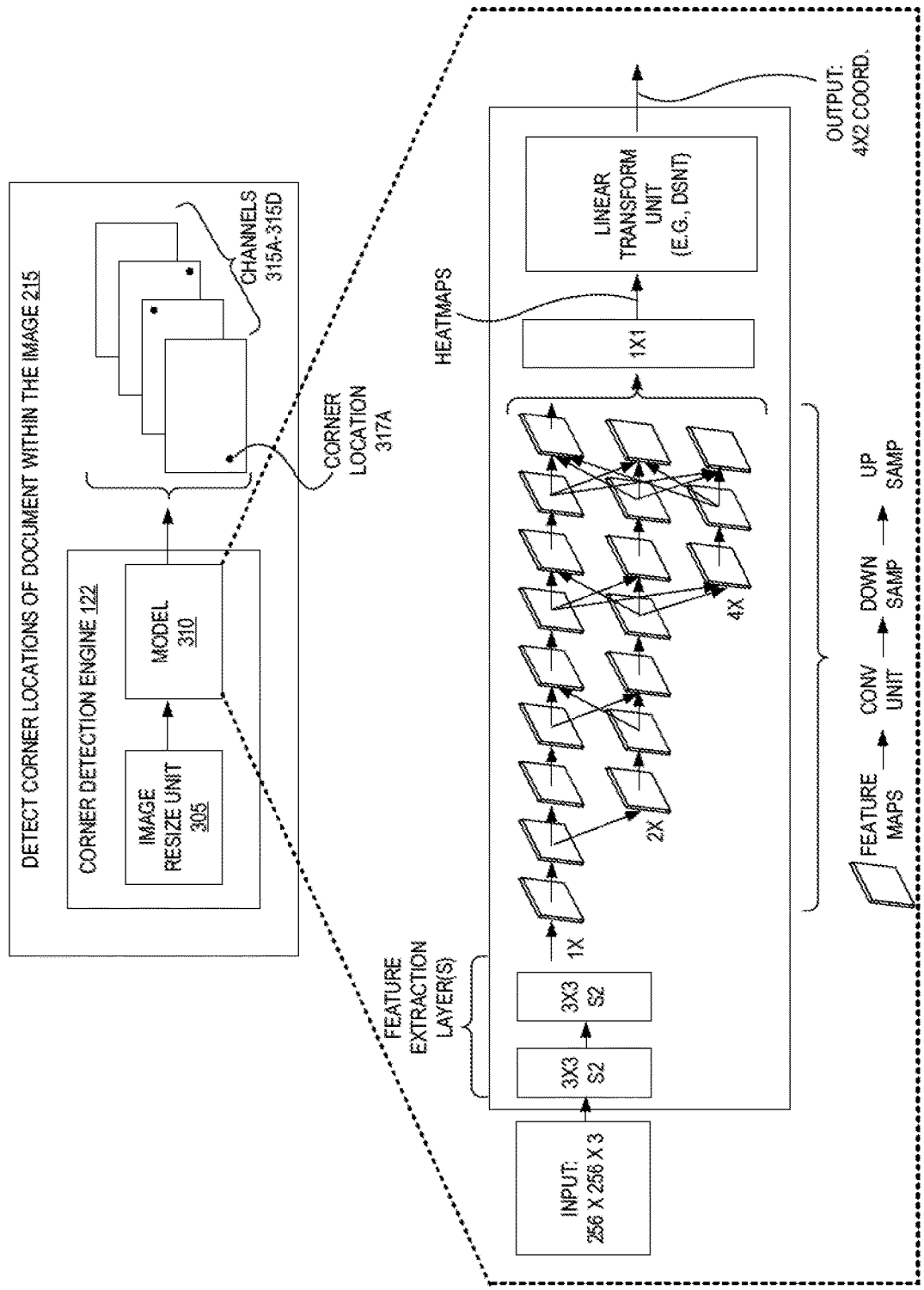
FIG. 3 is a diagram illustrating document corner detection according to some embodiments.

For further detail, FIG. 3 is a diagram illustrating document corner detection corresponding to block 215 according to some embodiments. In FIG. 3, the corner detection engine 122 utilizes an image resize unit 305 to generate an input image for a ML model 310 that generates multiple outputs in the form of four channels 315A-315D, where each channel may directly indicate a location of a corresponding corner (e.g., corner location 317A) or provide a heatmap indicating predicted likelihood locations of the corresponding corner. The input image may be, for example, of size 256×256 over 3 channels of color. The ML model 310 may be a neural network (e.g., from a pixel-wise segmentation family of models), which as shown may include one or more feature extraction layers, one or more convolutional and/or de-convolutional layers, one or more pooling layers and/or one or more upsampling layers, a linear transform layer (e.g., differentiable spatial to numerical transform (DSNT) layer) that transforms the spatial heatmaps into a normalized coordinate space, and the like.

Figure 4:
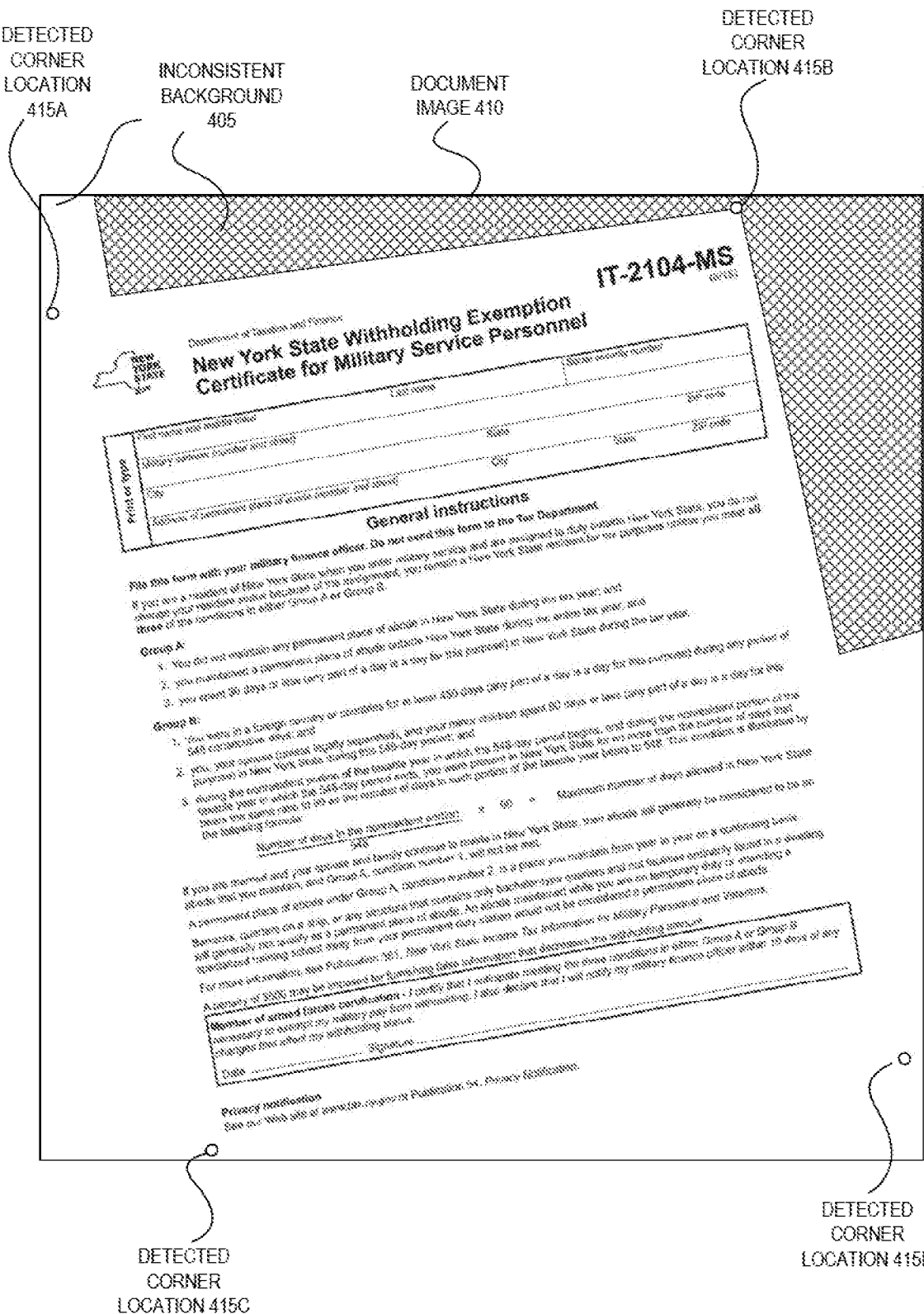
FIG. 4 is a diagram illustrating exemplary corner detection results according to some embodiments.

As a result, corners can be detected precisely even in images taken "in the wild" with lighting, perspective, and/or background issues as shown in FIG. 4, which is a diagram illustrating exemplary corner detection results according to some embodiments. As shown, an example document is depicted within a document image 410 at a skew and against a varying background 405. In this example, despite the inconsistent background 405 that may not present any contrast with regard to the document in whole or in part, the four corner locations 415A-415D can be detected in a highly accurate manner.

Turning back to FIG. 2, with the identified corners, the homography is computed at block 220, which may be performed by the homography generator 124, and at block 225 the image is rotated and/or warped/skewed based on the homography, which may be performed by the warp-skew engine 126. This second rectifying pipeline also includes, at block 250, performing orientation correction analysis (e.g., using a ML model trained to detect the orientation of documents) and correction as necessary (e.g., rotating the image by 90 degrees counterclockwise when the ML model has determined that the image was rotated 90 degrees clockwise from the desired orientation.

In some embodiments, if a result of detecting the corner locations as represented by block 215 is not satisfactory—such as when the confidence of one or more of the predictions does not meet a threshold, the overall polygon formed by the corners is invalid, etc.—the second pipeline can be designated as failed and a fallback process may be utilized, as reflected by arrow 250, by instead using the first rectifying pipeline to rectify the image. Although the resulting rectified document may or may not be of the same level of quality as those typically generated via the second pipeline for images generated by mobile-type devices, the use of the first pipeline will typically provide satisfactory results for many applications and eliminate failure scenarios.

At the conclusion of each pipeline, the operations 200 include directly or indirectly (e.g., via an intermediary storage service) passing on the rectified image and optionally the homography information to a downstream component at block 255, which may perform further processing of the document using the rectified image, yielding high-quality results. Eventually, results of the processing may be presented to a user, which may include displaying the original image along with a bounding box overlaid over the detected document which can be constructed using the homography information.

Figure 5:
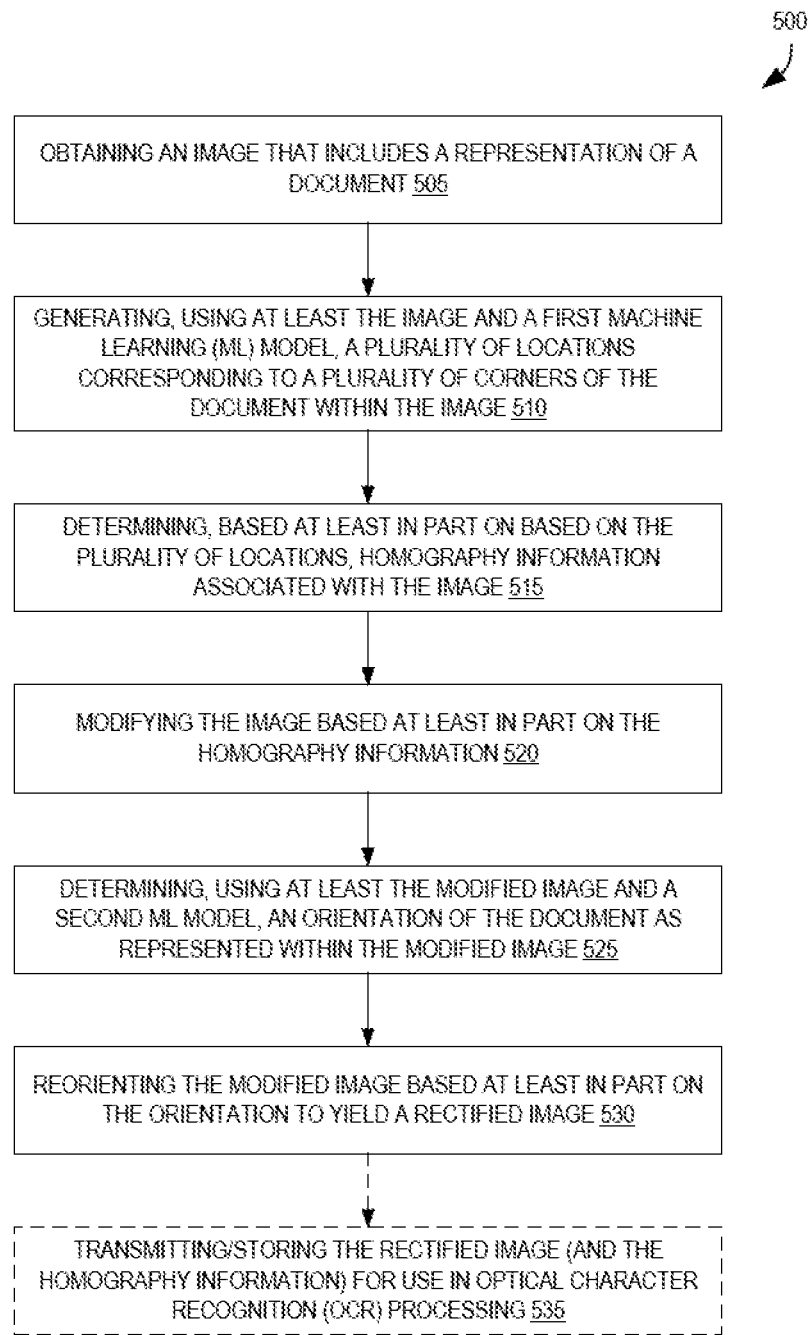
FIG. 5 is a flow diagram illustrating operations of a method for document rectification via homography recovery using machine learning according to some embodiments.

For even further detail of exemplary rectification processing, FIG. 5 is a flow diagram illustrating operations 500 of a method for document rectification via homography recovery using machine learning according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the image rectification 111 system of the other figures.

The operations 500 include, at block 505, obtaining an image that includes a representation of a document; at block 510, generating, using at least the image and a first ML model, a plurality of locations corresponding to a plurality of corners of the document within the image; at block 515, determining, based at least in part on based on the plurality of locations, homography information associated with the image; at block 520, modifying the image based at least in part on the homography information; at block 525, determining, using at least the modified image and a second ML model, an orientation of the document as represented within the modified image; and at block 530, reorienting the modified image based at least in part on the orientation to yield a rectified image. Optionally, the operations 500 further include, at block 535, transmitting/storing the rectified image (and the homography information) for use in optical character recognition processing.

As indicated herein, the rectified images and optionally the homography information may be used by other components, e.g., of a document processing service. In modern industry, techniques from the field of ML are being adapted in a variety of fields for a variety of purposes. For example, using ML to analyze images to detect the existence and locations of objects is one such application. Another application includes analyzing images (that carry a representation of a document) to identify what text is within the document. For example, to implement a document processing service, numerous types of ML models may be utilized to analyze digital documents seeking to, for example, identify where text is represented within an image representation of a document and identify what that text is. For example, an exemplary document processing service may use OCR technology to automatically detect printed text and numbers in a scan or rendering of a document, such as a legal document or a scan of a book. As another example, an exemplary document processing service may detect key-value pairs in document images automatically so that users can retain the inherent context of the document without any manual intervention, where a key-value pair is a set of linked data items. For instance, on a document the field "First Name" would be the key and "Jane" may be the value of that key. This functionality makes it easy to import the extracted data into a database or to provide it as a variable into an application.

An exemplary document processing service may preserve the composition of data stored in tables during extraction, which can be helpful for documents that are largely composed of structured data, such as financial reports or medical records that have column names in the top row of the table followed by rows of individual entries. Users can use this functionality of an exemplary document processing service to automatically load the extracted data into a database using a pre-defined schema. For example, rows of item numbers and quantities in an inventory report will retain their association to easily increment item totals in an inventory management application.

In some embodiments, the exemplary document processing service can return extracted data along with bounding box coordinates, which is a polygon frame that encompasses each piece of identified data, such as a single word, a line, a table, individual cells within a table, or even the location of a document within an image. Such functionality is helpful for being able to audit where a word or number came from in the source document or to guide the user in document search systems that return scans of original documents as the search result. For example, when searching medical records for patient history details, users can easily make note of the source document and quickly take note for future searches.

In some embodiments, an exemplary document processing service can return a confidence score for everything it identifies to allow users to make informed decisions about how to use the results. For instance, if a user seeks to extract information from tax documents and wants to ensure high accuracy, the user can create business logic to flag any extracted information with a confidence score lower than some threshold to be further reviewed. However, users may also choose a lower threshold for other types of documents where the consequences of an error have little to no negative consequences like processing resumes or digitizing archived documents.

Embodiments of a document processing service provide an automatic layout-free system that accommodates various types of documents without necessarily needing to have explicit knowledge of a document (or segment, such as a form) in advance but can instead intelligently analyze the document to detect the type of document, document segments, and data within the document segments (e.g., where the keys and values are located in a form, without the use of a faulty template-matching approach).

Figure 6:
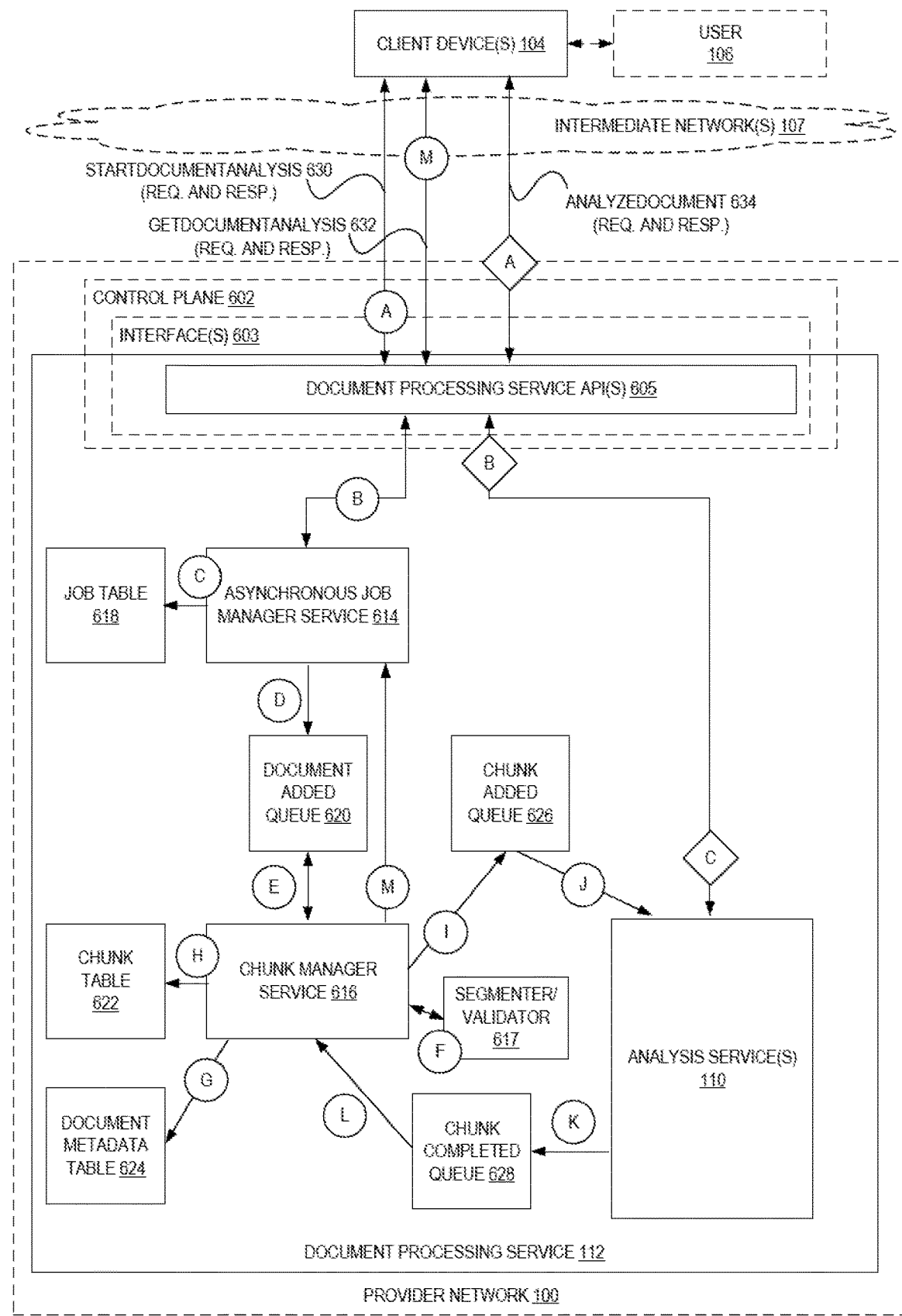
FIG. 6 is a diagram illustrating an architectural framework of a system for layout-agnostic complex document processing according to some embodiments.

FIG. 6 is a diagram illustrating an architectural framework of a system for layout-agnostic complex document processing according to some embodiments. The system includes a set of one or more document processing service application programming interface(s) 605, an asynchronous job manager service 614, a chunk manager service 616, and one or more analysis services 110, any of which may be implemented as software modules executed by one or multiple computing devices at one location or multiple locations. These elements of the system may rely upon a set of data structures (e.g., queues, database tables, flat files, etc.)—implemented within the system or provided by other components (e.g., other services)—such as the job table 618, document added queue 620, chunk table 622, document metadata table 624, chunk added queue 626, and/or chunk completed queue 628. However, these data structures may be consolidated (e.g., multiple ones of the structures can be implemented in a joint manner) or further expanded in other embodiments according to techniques known to those of skill in the art.

In some embodiments, this system is implemented as part of a document processing service 112 that itself may be implemented within a provider network 100.

To analyze a document, a user 106 may utilize one or more API calls to the document processing service API(s) 605, which may be carried by HyperText Transfer Protocol (HTTP) request messages destined to an endpoint associated with the provider network 100 or document processing service API(s) 605, though in other embodiments the API calls may be made via function/procedure calls to a library that implements the document processing service 112, in which case the document processing service 112 may optionally be resident on the client device 104 (example not illustrated) and thus, locally invoked by client code. For example, a first type of API call—here represented as using a method of "startDocumentAnalysis" 630—may be sent as a request at circle (A) to indicate to the document processing service 112 that the user 106 desires for asynchronous analysis to be performed for one or multiple documents. In such an asynchronous mode of operation, the document processing service API(s) 605 may respond with a "unique" (at least within a particular period of time in some particular context) job identifier (ID) in a response (to the request) that can later be used to poll for the job's status and/or obtain eventual results. (This job ID can be obtained, for example, by the asynchronous job manager service 614 as described below, which in some embodiments is the only component of the asynchronous path that is on a request critical path.)

By way of example, the startDocumentAnalysis 630 request may include, for example, a "Document" attribute including a number of bytes carrying the document itself, or a set of identifiers of a location of a document (e.g., at/in a storage service). The startDocumentAnalysis 630 request may also include a set of feature types indicating which types of features the user seeks to extract from the document (e.g., all tables, all forms (or, key-value pairs), all types of features, etc.), a request token (for idempotency, which could be an ASCII string of some size—e.g., between 1 and 64 characters in length), a job tag (for tracking purposes, which also could be an ASCII string of some size—e.g., between 1 and 64 characters in length), an identifier of a notification channel (e.g., a provider network resource name) that can be used to send a job completion event, etc. Similarly, the response to a startDocumentAnalysis 630 request may include a job identifier as indicated above that can be used by the user to track the status of the job and/or obtain results of the job.

In contrast to this asynchronous processing configuration, as shown by diamond (A), another type of API call may be issued—here represented as using a method of "analyzeDocument" 634—to the document processing service API(s) 605 (e.g., carried by an HTTP request message) indicating that the user desires for synchronous analysis to be performed for one or more documents, and thus, the results of the process to be returned in a synchronous manner (e.g., within or otherwise identified by an analyzeDocument response message 634, which may be carried by an HTTP response message sent in response to an analyzeDocument HTTP request).

By way of example, the analyzeDocument 634 call may include, for example, a "Document" attribute including a number of bytes carrying the document itself, or a set of identifiers of a location of a document (e.g., at/in a storage service). The analyzeDocument 634 call may also include a set of feature types indicating which types of features the user seeks to extract from the document, e.g., all tables, all forms (or, key-value pairs), all types of features, etc. Similarly, the response to the analyzeDocument call may identify results in a variety of formats—e.g., a list of blocks identified within the document, a unique identifier of each block, a relationship between the block and other blocks (e.g., child or parent), a block type identifying a type of the block (e.g., block, key, page, value, line, word, etc.), an identifier of which page the block was found on, what entity type is inferred for the block, document metadata (e.g., number of pages, size, format, etc.), or other information.

In some embodiments, the document processing service API(s) 605 may be responsible for handling these incoming requests from users with as low latency as possible, and may also handle general administrative type tasks on behalf of the document processing service 112, including but not limited to metering, throttling, whitelisting, access control, and/or other functionalities known to those of skill in the art.

Either type of request—e.g., the startDocumentAnalysis request 630 or analyzeDocument request 634—may explicitly carry the document(s) to be analyzed or may carry an identifier that can be used to obtain the document(s). For example, a request may include one or more identifiers of one or more storage locations (e.g., a URI, a storage bucket/folder or path name) where one document or multiple documents are stored. Thereafter, the document processing service 112 may use the identifier(s) to obtain the document(s)—as one example, by sending a request to download one or more documents based on the identifier(s) and receiving one or more responses carrying the one or more documents.

Regarding the synchronous path, at diamond (B) the document processing service API(s) 605 may send a request (and/or the document) to the analysis service(s) 110 for processing, and the results of the processing can be passed back at diamond (C) to the document processing service API(s) 605, and ultimately passed back to the client device 104 in a synchronous manner, e.g., as a response to the analyzeDocument 634 request from diamond (A).

Turning to the asynchronous path, at circle (B) the document processing service API(s) 605 can provide the request to an asynchronous job manager service 614. The asynchronous job manager service 614 may implement the general managerial logic relating to managing asynchronous jobs and their associated state. These responsibilities may include one or more of: creating an authoritative job identifier for the job (e.g., which may be passed back to the client in a startDocumentAnalysis response 630 as described above), persisting the initial job details (e.g., the job ID, what user is involved, what is the time of the request, what document(s) are to be processed, etc.) into the job table 618 at circle (C), queuing a message/entry onto the "DocumentAdded" queue 620 (e.g., each entry indicating a job ID and an identifier of the document such as a URI/URL) indicating that a new job has been created at circle (D), monitoring and maintaining the state information for a customer job (e.g., via the job table 618), providing this state information to the document processing service 112 when requested, and/or other job-related tasks. The job table 618, in some embodiments, represents the data that is needed to answer user API calls about the status of their asynchronous processing jobs.

The Document Added queue 620 may serve to buffer incoming asynchronous jobs (e.g., one document per job). This queue 620 may assist in implementing a fair share scheduling that gives priority to smaller documents.

The chunk manager service 616 (e.g., a worker thread of the chunk manager service 616) at circle (E) may detect that a document has been added to the DocumentAdded queue 620 (e.g., via polling the queue, via subscribing to events or notifications issued by the queue, etc.). With each document, the chunk manager service 616 may perform a query/lookup at circle (G) with a document metadata table 624 to see if the document has already been validated (e.g., during a previous round of processing, where the analysis of the document may have been paused or halted)—if so, the chunk manager service 616 need not again download the document, validate the document, examine the number of pages of the document, etc. If not, the chunk manager service 616 may detect and divide multipage documents into one or more "chunks" via the segmenter/validator 617 (F), where each chunk can fit into a single inference batch. In some embodiments, a chunk is made up of one or more document pages—for example, twenty pages per chunk. The system may process chunks in parallel in a distributed manner. To implement this process, the chunk manager service 616 may be responsible to perform one or more of the following: splitting the document into chunks (e.g., via segmenter/validator 617) and storing/uploading those chunks at/to a storage location (e.g., of a storage service of the provider network 100), inserting records in a chunk added queue 626 at circle (I) that correspond to the segmented chunks, extracting available metadata about the document file objects (such as text, tables, etc., which can be provided later to the analysis service 110 components to improve model accuracy, for example) and storing this information in a document metadata table 624 at circle (G), maintaining persistent records of the processing status of each chunk in the chunk table 622 (which stores metadata about the status and result of each chunk that is or has recently been processed) at circle (H), determining when all chunks of a document have been processed by the analysis service(s) 110 (via monitoring of chunk completed queue 628 at circle (L), discussed later herein), aggregating a collection of chunk results into a single overall result for the document, notifying the asynchronous job manager service 614 at circle (M) once processing has been completed for a document, and/or other processing tasks. The asynchronous job manager service 614 may then update its job table 618 as necessary (e.g., to indicate a completion status of the job, etc.). Notably, one or multiple instances of the analysis service(s) 110 may exist, which may identify chunks added to the chunk added queue 626 (e.g., via polling the chunk added queue 626, by subscribing to events of the chunk added queue 626, etc.) and perform analysis on a single chunk at a time, or on multiple chunks in parallel.

The chunk added queue 626 may optionally include a set of queues which represent different chunk priorities—e.g., high priority, lower priority (e.g., for larger documents), etc. The chunk added queue 626 may act as a buffer between the document segmentation process and the actual analysis that allows for chunks to be processed in parallel as well as optionally supporting different chunk priorities. In some embodiments, this queue 626 further assists in implementing a fair share scheduler that could optionally favor specific chunks inside a document.

The chunk completed queue 628, upon the completion of analysis for a chunk, is updated with an entry that can be is read by the chunk manager service 616 and used to update the status of the job as a whole as well as create the final (completed) result.

After submitting the processing job via the startDocumentAnalysis 630 request (and the receipt, by the client device 104, of a job ID) the client device 104 may "poll" the document processing service API(s) 605 to determine the status of the job (e.g., complete, still processing, error, etc.), and obtain the results of the job when it is complete. These tasks may be performed by a single API call—getDocumentAnalysis 632 (e.g., including a job ID, seeking the job status and optionally the analyzed document output, if the job is finished)—or separated into distinct API calls (e.g., getJobStatus and getDocumentAnalysis), for example. Upon receipt of such a call, the document processing service API(s) 605 may pass the request onto the asynchronous job manager service 614, which can consult the job table 618 (or another results store, when output from a completed job is stored separately) to provide the necessary job status and/or job output back to the document processing service API(s) 605 and thus back to the requesting client device(s) 104. A variety of types of status values may be used according to the implementation, such as any or all of an invalid document type was provided, the provided document was password protected, the identified file is unable to be obtained, the size of the file is larger than a threshold amount, etc.

In some embodiments, an additional responsibility of the chunk manager service 616 is to ensure that a small number of very large jobs do not consume all available resources and thus starve smaller jobs where faster processing would be expected by users. For example, if there are ten chunk manager service 616 instances having some number (e.g., 10) of threads each, and a user submits several hundred or thousand large documents to be processed, it could be the case that one-hundred percent of some resource could be consumed for a long period of time and block all other jobs until either new hardware is allocated or the original jobs complete. Thus, in some embodiments the chunk manager service 616 may analyze the document, and if there is not enough idle capacity available for the regular set of analysis operations, it may return the document to the queue until a later point in time. In this case, the chunk manager service 616 may cache the size details (in the document metadata table 624) so that the next time that document is processed it doesn't need to be re-downloaded and/or analyzed to determine its size. Some embodiments may also use file-based heuristics to determine a document's "likely" size—for instance, the number of bytes of a document provide a useful indication of an estimated page count.

In some embodiments, the chunk manager service 616 will segment and "validate" the documents as introduced above (e.g., via segmenter/validator 617). For security reasons, processes that actually open a document (for validating or segmenting) may need to be performed in a "sandbox" that is partitioned from the internet to avoid inadvertently participating in an attack or other malfeasance. Thus, the a segmenter/validator 617 component of the chunk manager service 616 may be a separate, deployable unit that may co-reside or otherwise be accessible to the chunk manager service 616 (and optionally, the analysis service(s) 110). For example, in some embodiments the asynchronous flow utilizes both the segmenter and validator components when processing the full document, whereas the synchronous flow may include directly providing the document(s) directly to the analysis service(s) 110 where they may be validated (as being proper documents, within the analysis service(s) 110 or via use of the segmenter/validator 617) but in many embodiments, not segmented (as the synchronous path may be constrained to single-page documents, for example).

Accordingly, in some embodiments the segmenter/validator 617 component may be a "sidecar" service, and/or may have two different APIs exposed—one that validates and returns metadata such as page count, etc., and another that performs the actual document segmentation, which can help support fair scheduling in that large files can be detected and requeued in moments of increased utilization.

Notably, these various service components can be auto-scaled (to include more or fewer instances of each service) based on resource consumption to allow for ease of scaling up or down and ensure satisfactory performance of the entire system.

Embodiments may further implement protections to defend against bugs that might trigger infinite work for the asynchronous system, e.g., by implementing maximum retry counts, dead letter queues, etc., to combat this situation. Thus, once a chunk has failed processing more than some threshold number of times, it can be added to a "dead letter queue" which results in an alarm being generated.

Figure 7:
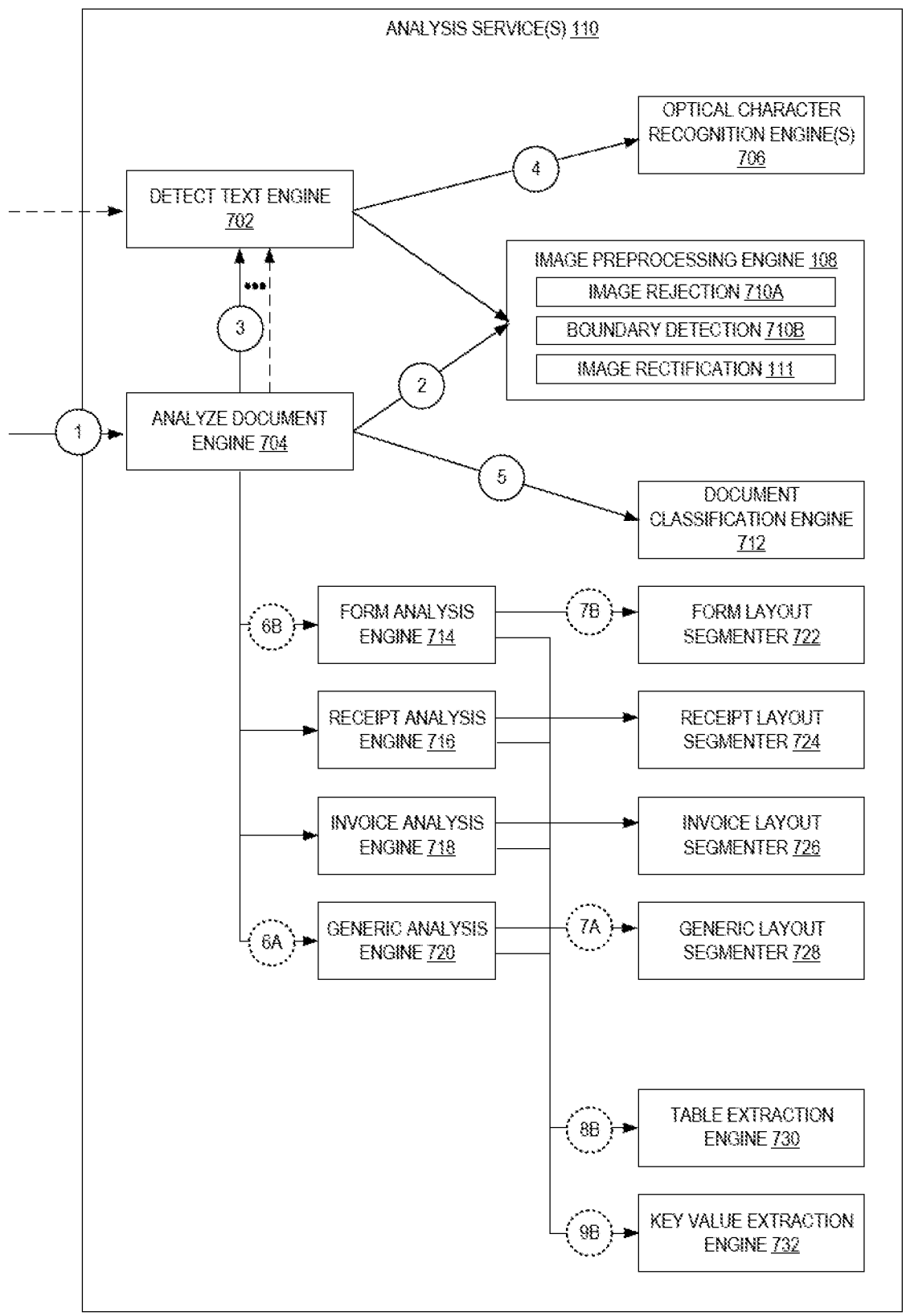
FIG. 7 is a diagram illustrating an exemplary architecture of an analysis service for layout-agnostic complex document processing according to some embodiments.

For detail regarding how the actual processing of a document is performed by the analysis service(s) 110, we turn to FIG. 7, which is a diagram illustrating an exemplary architecture of an analysis service 110 for layout-agnostic complex document processing according to some embodiments. This exemplary architecture includes a detect text engine 702, an optical character recognition (OCR) engine 706, an analyze document engine 704, an image preprocessing engine 108, a document classification engine 712, form analysis engine 714, receipt analysis engine 716, invoice analysis engine 718, generic analysis engine 720, and other supporting segmenters 722-728 and engines 730-732. As indicated above, the analysis service 110 may be implemented using software executed by one or multiple computing devices, possibly in a distributed manner, and thus these components may similarly be implemented as software, each executed by one or multiple computing devices.

At circle (1), the document image is passed to the main analyze document engine 704. At circle (2), the data of the image (carrying the representation of the document)—e.g., the bytes that make up the image—are passed to the document classification engine 712, where the image is validated to ensure that a document does exist within the image (by image rejection 710A module, which can comprise an image library that can ensure the image is a proper image of a document, and/or an ML model trained to identify document elements such as text, lines, etc., such that a picture of a dog, for example, would be rejected as improper). The image preprocessing engine 108 may also rectify the image with image rectification 111 module (e.g., by rotating, skewing, etc., the image to align it to have 90 degree edges, etc.) and segment the image (via boundary detection 710B module) into distinct elements—for example, into two receipts scanned on a single page. The boundary detection 710B module may comprise an object detection ML model trained to identify particular elements of a document, e.g., a table, a form, a paragraph of text, etc., with bounding boxes that encapsulate these elements. The result of this call to the image preprocessing engine 108, in some embodiments, is an array of image bytes and associated bounding boxes of elements, where an element may or may not correspond to a segment.

For each such element identified by the image preprocessing engine 108, the corresponding bytes of that element of the image are passed to the detect text engine 702 at circle (3), which can identify the text within the element via use of one or more OCR engines 706 known to those of skill in the art. In some embodiments, the calls made at circle (3) may be done at least partially in parallel. The one or more OCR engines 706 can detect and recognize text within an image, such as document keys, captions, numbers, product names, etc., and may support text in most Latin scripts and numbers embedded in a large variety of layouts, fonts and styles, and overlaid on background objects at various orientations. The OCR engine(s) 706 may include a first engine that identifies bounding boxes specific to the text or portions of the text (such as words), and a second engine that uses these bounding boxes to identify the particular text within the bounding boxes. As a result, the OCR engines 706 may generate a list of "words" found in the document in a 3-tuple identifying where the word was located, what the word is, and a confidence score: [Bounding Box, Text Value, Confidence Score].

At circle (5), the segmented image resulting from the image preprocessing engine 108 may be passed to the document classification engine 712, which can identify what "segment" the element is, or what one or multiple segments are within an element. The document classification engine 712 may be a ML model (such as a convolutional neural network (CNN) or other deep network) trained to identify different types of segments, such as paragraphs, forms, receipts, invoices, etc. The document classification engine 712 may thus output identifiers of what portions of the element include what type of segment—for the sake of this example, we assume that a first segment is identified as being of type "paragraph" while a second segment is identified as being of type "form."

The paragraph segment is passed to the generic analysis engine 720 at circle (6A), where it may further segment the segment into sub-segments—e.g., paragraph, line, etc. at circle (7A) via use of a generic layout segmenter 728, optionally resulting in an array of Semantic Region objects [Region Label, Bounding Box, Id]. Beneficially, this call can be parallelizable as the result may not be needed until a final consolidation of the result.

Similarly, the form segment is passed to the form analysis engine 714 where it may further segment the segment into sub-segments specific to forms (e.g., form title, figure, etc.) at circle (7B) by form layout segmenter 722, again optionally resulting in an array of Semantic Region objects [Region Label, Bounding Box, Id]. Likewise, this call can also be parallelizable as the result may not be needed until a final consolidation of the result.

For each of these semantic region objects representing a table, a call can be made to a table extraction engine 730 at circle (8B) that is trained to identify components of tables—e.g., table headings, rows, etc.

Similarly, the form segment may be passed to a key value extraction engine 732 at circle (9B) which, as described in additional detail herein, can analyze the form to identify keys in the form, values in the form, and which keys correspond to which values.

Although not described in this example, for other segments similar components can be utilized. For example, for a detected invoice segment, the segment can be passed to an invoice analysis engine 718, which may make use of an invoice layout segmenter 726 that can identify semantic region objects as described above. As invoices have fairly standard layouts across industries and even across the world—where there are line items having a description of the item, a number of items, a price per item, etc., the invoice layout segmenter 726 may comprise one or more neural networks trained to look at such an invoice and determine which portions are headings, which are line items, verify the invoice amounts (e.g., total items, total cost, etc.), etc., and generate data explaining what the invoice represents.

With the resulting information and corresponding location information (e.g., bounding boxes) of the segments, some embodiments perform additional post-processing to consolidate the information from the potentially multiple inference pipelines into a cohesive "hierarchical" result. For example, keys and values may include multiple lines or words, and thus post-processing can be implemented to identify bounding box overlaps (e.g., the existence of a bounding box within another bounding box), which can thus be represented in a hierarchical manner (e.g., as a parent-child relationship). By way of example, a document may include several top-level entities (e.g., a form, a receipt, a block of text) and each of these entities may have one or more entities (e.g., for a form, one or more key-value pairs) and perhaps so on at further levels (e.g., for a key-value pair, a key and a value; and likewise, for a value, one or multiple lines of text), etc.

Figure 8:
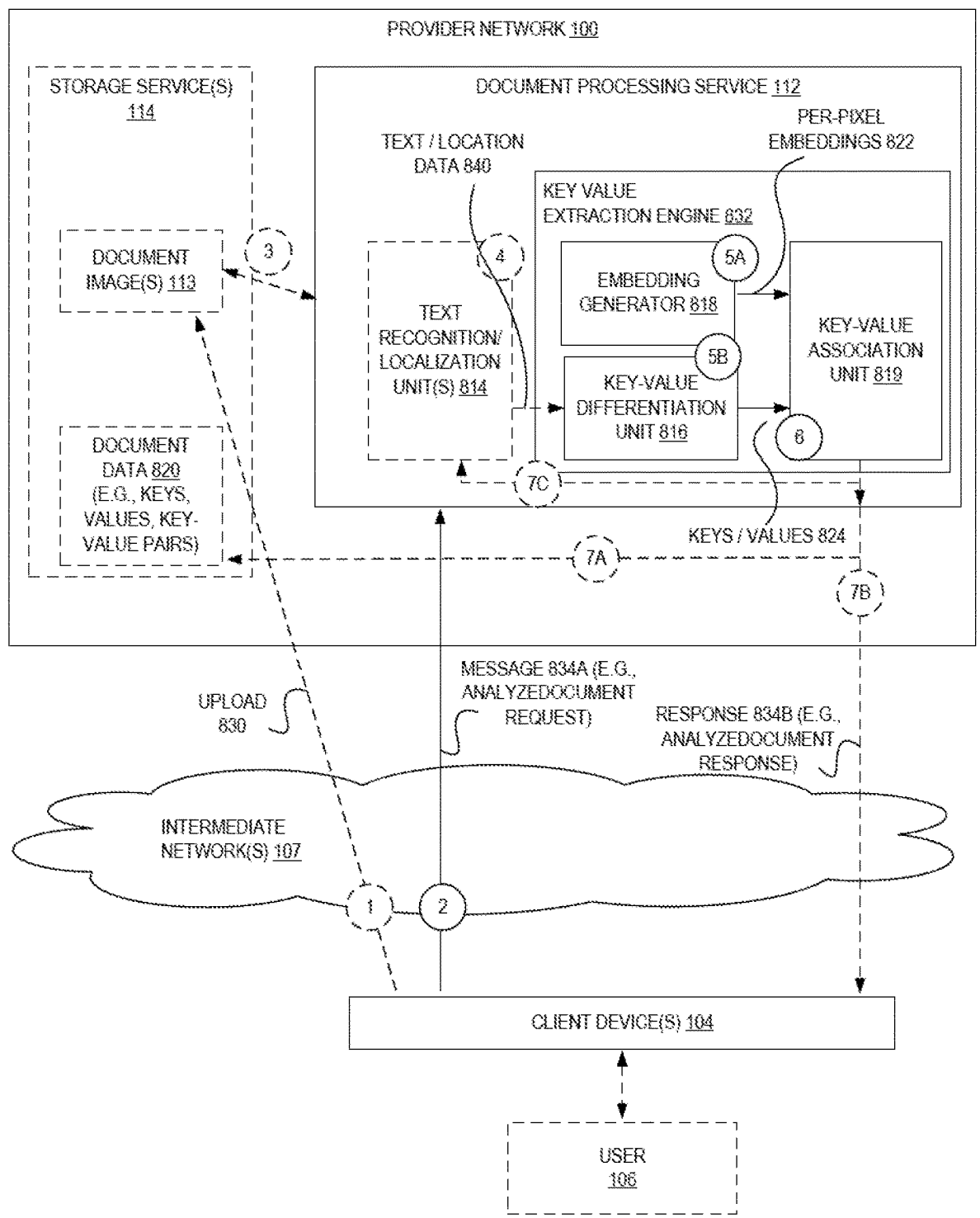
FIG. 8 is a diagram illustrating an environment including a document processing service of a provider network for automated form understanding via layout-agnostic identification of keys and corresponding values according to some embodiments.

For further detail of an exemplary implementation and use of a key value extraction engine 732, FIG. 8 is a diagram illustrating an environment including a document processing service of a provider network for automated form understanding via layout-agnostic identification of keys and corresponding values according to some embodiments.

As indicated above, to utilize the document processing service 112, a user 106 may utilize a client device 104 to obtain (e.g., create, download, capture via a camera/optical sensor, etc.) a document image 113. The document image 113 may be a digital file storing a representation of a document such as a form. For example, the document image 113 may be a Portable Document Format (PDF) file, an image including a representation of a document (e.g., a JPG, GIF, PNG), etc.

Optionally, the user 106 may upload 830 the document image 113 (e.g., a digital image) to a location that is distinct from the document processing service 112 at circle (1). For example, the user 106 may cause the electronic device 104 to send the document image 113 to be stored at a location of a storage service 114 within (or alternatively, outside of) the provider network 100. The storage service 114 may provide, in a non-illustrated response message, an identifier of the document image 113 (e.g., a Uniform Resource Locator (URL) for the file, a unique identifier of the file within the context of the storage service 114 or provider network 100, a name of a folder (or storage "bucket" or group) that includes the file, etc.)

At circle (2), the user 106 may utilize a client device 104 to cause it to send a processing request 834A to the document processing service 112. The processing request 834A may indicate the user's desire for the document processing service 112 to process a particular document image 113 (or group of electronic documents) in some manner.

For example, the processing request 834A may indicate that text of a form represented within the document image(s) 113 is to be identified, and that text "values" corresponding to text "keys" within the form are to be identified and paired, stored, and/or processed in some manner. As one example, an document image 113 may comprise an image file that was captured by an optical sensor of a scanner device or a user's mobile device, where the image file is a picture of a form such as a government-issued form document (e.g., a W2 form, a tax return form, etc.), a form provided by a company (e.g., a product order form, an employment application, etc.), or other type of form. Thus, the processing request 834A may indicate a request to identify data values entered within the form—e.g., a number (the value) of years of experience (the key) entered into an employment application—and store those values (e.g., within a database, which may have columns/keys corresponding to form keys), process those values (e.g., using a special purpose script, application, or set of rules), etc.

The processing request 834A may include (or "carry") the document image 113 or may include an identifier of a document image 113 (e.g., a URL). In a use-case where the processing request 834A includes the document image 113, the document processing service 112 may optionally at circle (3) store the document image 113 via a storage service 114. In a use-case where the processing request 834A identifies the document image 113, the document processing service 112 may obtain the document image 113 at circle (3) based on the identifier (e.g., by sending a HyperText Transfer Protocol (HTTP) GET request destined to a provided URL).

To process the document image 113, optionally a set of pre-processing operations may be performed—e.g., verify that a page/form is present in the image, determine whether the image needs to be rotated, rectify the page, clean up noise, adjust coloring, contrast, or the like, determine if the image is of sufficient quality (in terms of resolution, occlusions, contrast), etc. This set of preprocessing operations may be performed by the image preprocessing engine 108 of FIG. 1, for example.

At circle (4) the text recognition/localization unit 814 may operate upon the document image 113 to identify locations of text within the document. The text recognition/localization unit 814 may comprise, for example, an object detection ML model trained to identify locations of characters, words, lines of text, paragraphs, etc., as is known to those of skill in the art. The text recognition/localization unit 814 can identify the locations of the text in the form of bounding boxes, coordinates, etc.

Optionally, the text recognition/localization unit 814 can also identify the text itself within the document image 113. This identification may include using the identified locations of text and may include performing an OCR process upon these locations. Thus, this OCR procedure may be run against a subset of the document (in the form of the identified locations) and not against the entire document itself, which can be faster, more resource efficient, and eliminate or reduce the analysis of other non-necessary text that may be within the document (e.g., instructions, footnotes). In some embodiments, such text identification occurs before the operations described regarding circles (5A), (5B), and/or (6), though in other embodiments it occurs in parallel with ones of these operations, or even after these operations have completed. For example, after key regions and associated value regions have been identified (e.g., after circle (6)), key-value association unit 819 may trigger (directly or indirectly) the text recognition/localization unit 814 to identify what the text is within the key regions and value regions. Alternatively, the text recognition/localization unit 814 may simply perform an OCR process that may not include a separate location detection phase.

However, in some embodiments the text recognition/localization unit 814 may utilize different techniques to achieve the same result. For example, the document image 113 may potentially be a PDF file already including the text within the document (instead of just carrying a "flat" image alone), and the text recognition/localization unit 814 may identify this text and also identify the locations of that text (e.g., from the PDF metadata, from its own object detection or matching model, etc.).

At this stage, text has been detected as being represented within the document image 113, and locations of the text have similarly been detected. However, when the document image 113 is a form—and especially a "new" form that has not yet been observed—there is no knowledge of which text elements are "keys" of the form and which are "values." As is known, a form may include one or more keys such as "first name," "last name," "full name," "address," "amount," "value," etc., and the completed form may have values for one or more (or possibly all) of these keys—e.g., "Dominic," "200.50," "Samuel," etc. To be able to act upon this data in a programmatic and intelligent way, it is imperative to determine which text elements are keys and which are values.

The detected text elements and/or location data 840 are provided to the key-value differentiation unit 816, which can operate on portions (or all) of the document image 113 at circle (5B) with this provided information to determine which of the text elements are keys and which of the text elements are values. The detected text elements and location data 840 may be provided by sending this data (e.g., within files, or within a "string" or "blob" of text) directly to the key-value differentiation unit 816, by storing this data in a known storage location (e.g., by storage service 114) that the key-value differentiation unit 816 is configured to look in, by sending an identifier of such a location to the key-value differentiation unit 816, etc. Similarly, the document image 113 itself may be passed according to similar techniques together with or separate from the detected text elements and location data 840.

The key-value differentiation unit 816 operates by generating a feature vector for each text element (e.g., word or phrase) using one or more specially-trained ML models. The feature vectors created for each text element of a particular document image 113 are clustered into (at least) two different groups. The key-value differentiation unit 816 can then use labeled feature vectors (indicating whether corresponding text elements are keys or values) to determine which cluster includes feature vectors corresponding to "key" text elements and/or "value" text elements. The labeled feature vectors may have been provided/used during the training of the ML model(s), could be "actual" keys and values previously determined by the key-value differentiation unit 816 (and confirmed as being accurately detected), or a combination of both.

For example, according to some embodiments, a key-value differentiation unit 816 can identify which words or phrases of an electronic document are key fields and which words or phrases are key values. The key-value differentiation unit generates feature vectors for detected text elements from a document using a ML model that was trained to cause feature vectors for key fields to be separated from key values, feature vectors for key fields to be close to those of other key fields, and feature vectors for values to be close to those of other values. The feature vectors are clustered into two clusters. For values of each cluster, neighbors (e.g., nearest neighbors) can be identified from a labeled set of feature vectors, and based on the labels of the neighbors from each cluster, the identity of each cluster is determined.

When the text elements that are keys and/or the text elements that are values (or "keys/values 824") are determined, the keys/values 824 may be provided to the key-value association unit 819 and processed at circle (6) as described above. Additionally, at circle (5A) the embedding generator 818 may similarly operate on the document image 113 to generate per-pixel embeddings as described above, which are also provided to the key-value association unit 819 and processed at circle (6) as described above.

At this point, the key-value association unit 819 generates an output identifying which keys are associated with which values. This data may be stored via one or more storage services 114 as document data 820 at optional circle (7A). As one example, a representation of the keys and values may be generated (e.g., in JSON or eXtensible Markup Language (XML) format, as a string or blob of text, etc.) and stored as a file or as a database entry (or set of entries).

The output may be of a variety of formats. For example, for a value, the output may be a text string or a number, an indicator (e.g., CHECKED/UNCHECKED, TRUE/FALSE, etc.) indicating whether a checkbox (or other user interface input element) is marked, an image crop (e.g., a signature field), etc.

Additionally, or alternatively, at optional circle (7B) the data may be provided to an external (to the provider network 100) destination such as a client device 104 of the user 106, possibly within a processing response message 834, which may or may not be responsive to the processing request 834A. For example, the processing response message 834 may be sent as part of a session of communication where the user 106 utilizes a client device 104 to interact with the document processing service 112 via a web application (and thus, via a web endpoint interface 103) or another application.

As another example, in some cases the actual text may not have been yet identified (e.g., such as when the text recognition/localization unit(s) 814 have detected regions/locations including the text, but not the actual text itself), and thus at circle (7C) the key-value association unit 819 can cause the text recognition/localization unit(s) 814 to identify the actual text of the keys and values. For example, the key-value association unit 819 may send a request to the text recognition/localization unit(s) 814 that includes (or identifies) the particular regions of interest to be analyzed for text recognition. The resulting text could be returned to the key-value association unit 819, stored as document data 820, sent back within processing response 834B, etc., depending on the embodiment.

Although these exemplary functions and units 814/816/819 are described as being utilized in a serial or sequential manner, in various embodiments these functions may be implemented in other ways known to those of skill in the art with the benefit of this disclosure. For example, in some embodiments the key-value association unit 819 may operate partially or completely in parallel with other processing units—e.g., the key-value differentiation unit 816. In other embodiments, the key-value association unit 819 and key-value differentiation unit 816 may be implemented as a combined unit and possibly benefit from the existence of common processing tasks needed by each thus needing to only be performed once. Thus, many variations of these techniques and implementations exist which are covered by various embodiments.

Figure 9:
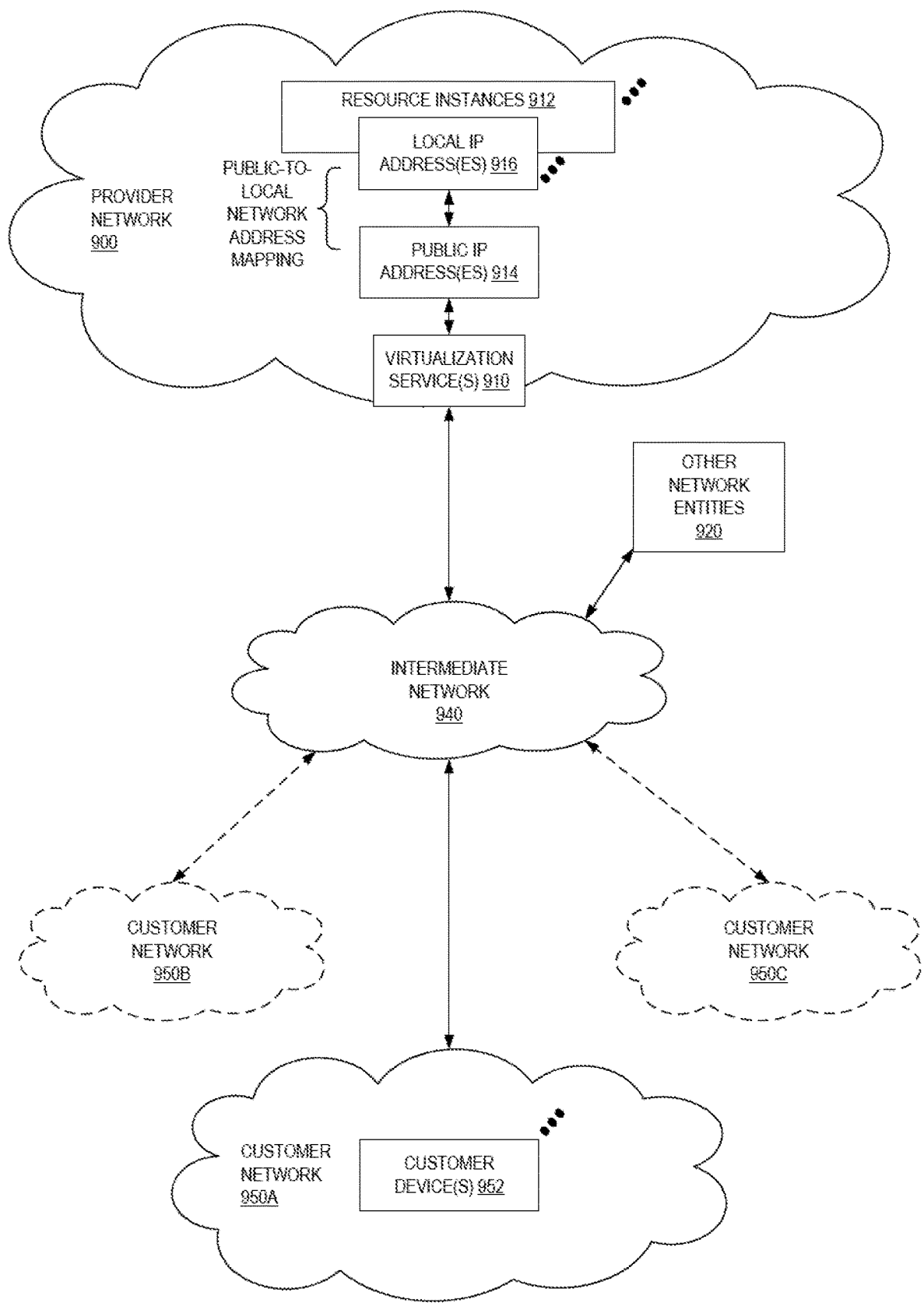
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
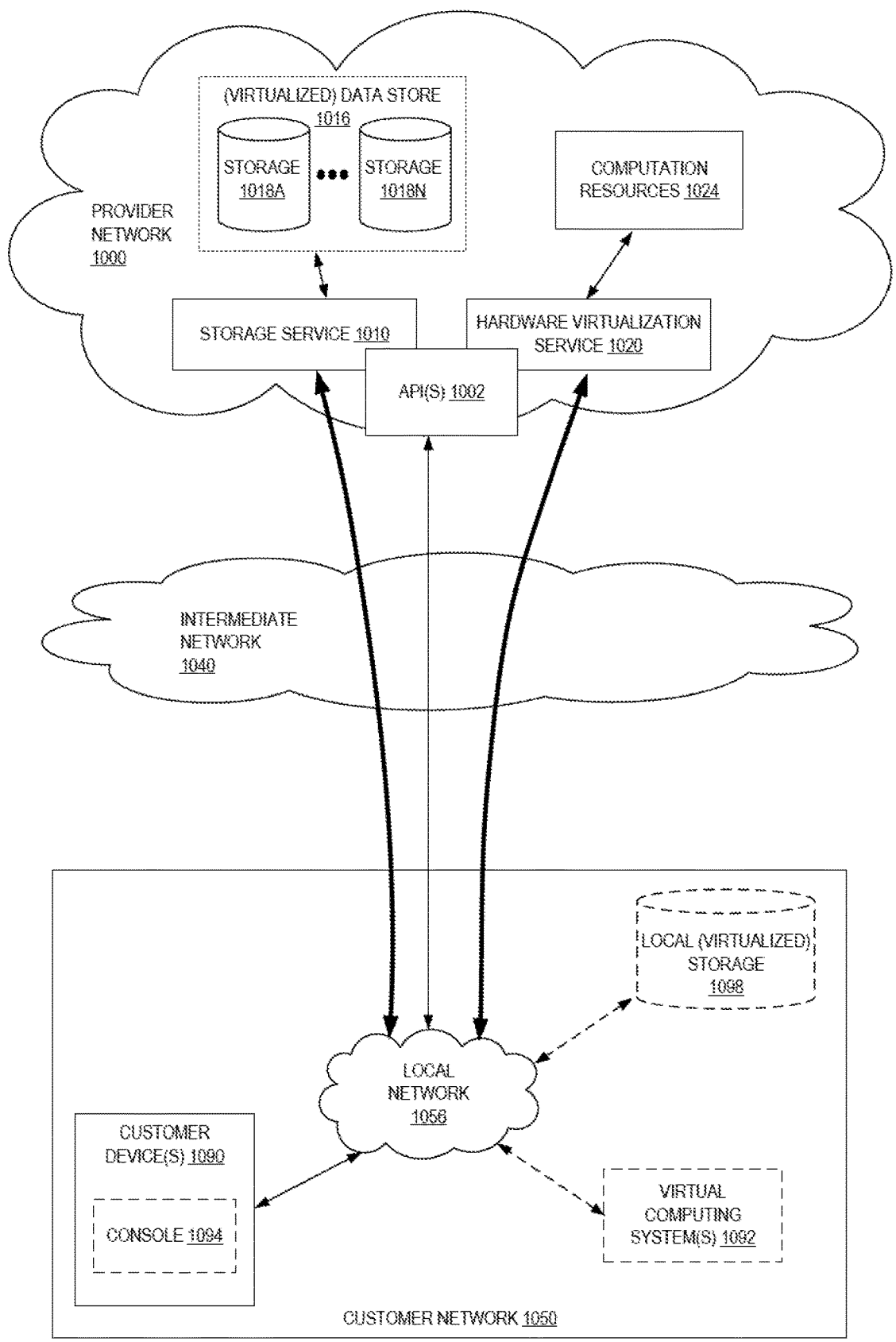
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
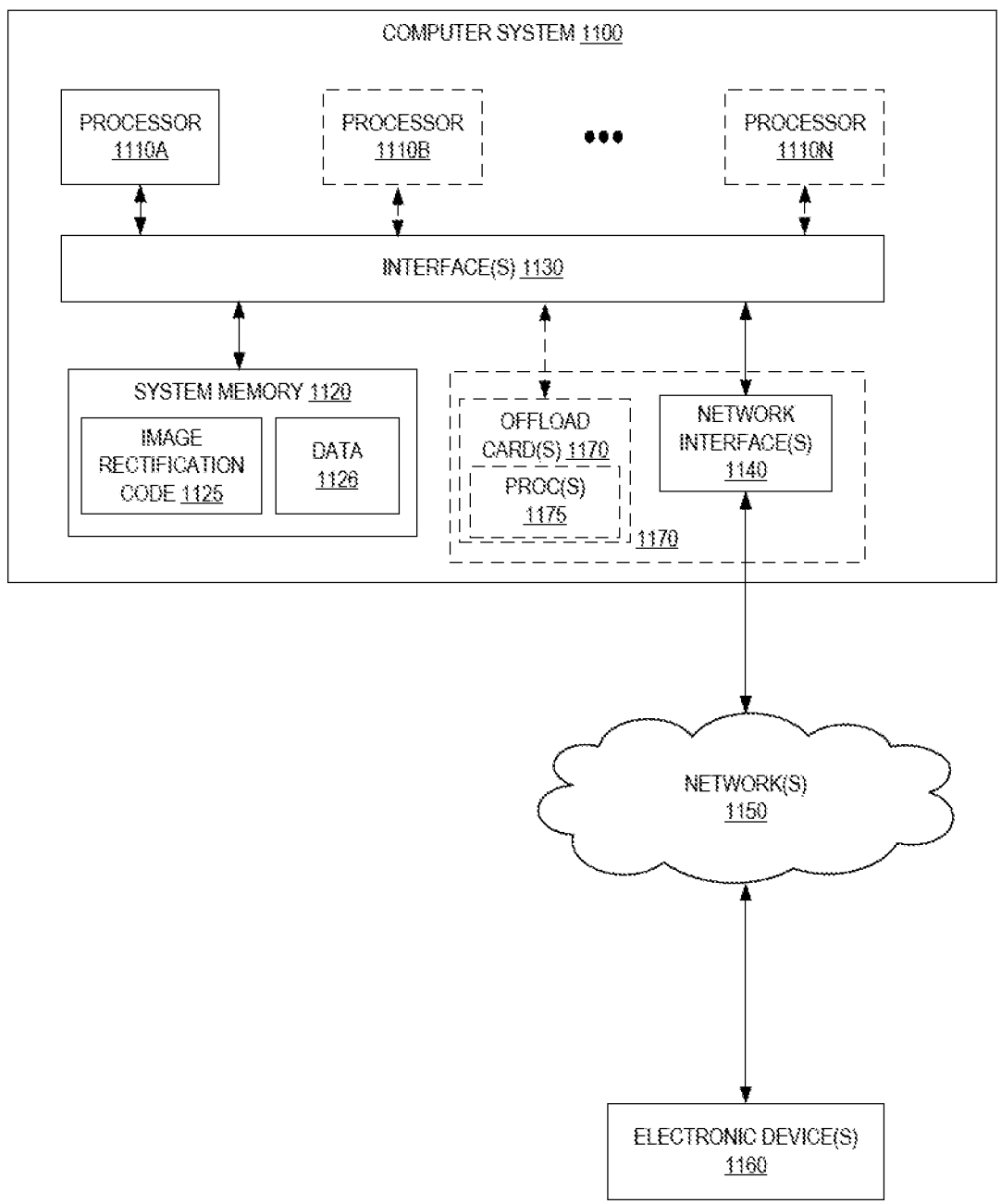
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as image rectification code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-

1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at a webservice endpoint of a provider network, a first request to analyze a document represented within a document image, the request including the document image or identifying a storage location of the document image;
    selecting, via use of the document image and a first machine learning (ML) model, a rectifying pipeline from a plurality of rectifying pipelines for use to rectify the document image, wherein the selecting includes:
        providing histogram information from one or more channels of the document image as input to the first ML model; and
        predicting, using the first ML model, a type of capture device that generated the document image;
    executing the rectifying pipeline for the document image, the rectifying pipeline including:
        determining, via use of the document image and a second ML model, a plurality of corner locations of the document within the document image,
        computing, via use of the plurality of corner locations, homography information for the document image,
        manipulating the document image based at least in part on the homography information to yield a manipulated document image,
        determining, via use of the manipulated document image and a third ML model, an orientation of the document within the manipulated document image, and
        rotating the manipulated document image based at least in part on the orientation to yield a rectified document image;
    initiating one or more optical character recognition (OCR) processes with the rectified document image to identify at least some text depicted within the document; and
    transmitting the text to a device outside of the provider network.

2. The computer-implemented method of claim 1, wherein selecting the rectifying pipeline comprises determining, based on an inference from the first ML model, that the document image was captured by a mobile electronic device, and wherein the method further comprises:
    obtaining a second request to analyze a second document represented within a second document image;
    selecting, via use of the second document image and the first ML model, a second rectifying pipeline from the plurality of rectifying pipelines for use to rectify the second document image; and
    executing the second rectifying pipeline for the second document image, wherein the second rectifying pipeline is different than the rectifying pipeline.

3. The computer-implemented method of claim 1, wherein the second ML model generates at least four outputs each indicating a different corresponding corner location of the document within the document image.

4. A computer-implemented method comprising:
    obtaining a document image that includes a representation of a document;
    selecting, via use of the document image and a first machine learning (ML) model, a rectifying pipeline from a plurality of rectifying pipelines for use to rectify the document image, wherein the selecting includes:
        providing histogram information from one or more channels of the document image as input to the first ML model; and
        predicting, using the first ML model, a type of capture device that generated the document image; and
    executing the selected rectifying pipeline, comprising:
        generating, using at least the document image and a second machine learning (ML) model, a plurality of locations corresponding to a plurality of corners of the document within the document image;
        determining, based at least in part on the plurality of locations, homography information associated with the document image;

modifying the document image based at least in part on the homography information to yield a modified document image;

determining, using at least the modified document image and a third ML model, an orientation of the document as represented within the modified document image; and reorienting the modified document image based at least in part on the orientation to yield a rectified document image.

5. The computer-implemented method of claim 4, further comprising:

receiving, at a webservice endpoint of a provider network, a first request to analyze the document represented within the document image, the request including the document image or identifying a storage location of the document image, wherein obtaining the document image comprises at least one of:

transmitting, by a document processing service within the provider network to a storage service within the provider network, a request for the document image based at least in part on the storage location of the document image, or receiving, by the document processing service, the document image from a control plane service of the provider network.

6. The computer-implemented method of claim 4, wherein the predicted type of capture device that generated the document image is a mobile electronic device.

7. The computer-implemented method of claim 6, wherein selecting the rectifying pipeline comprises:

generating a plurality of histograms for a corresponding plurality of channels of the document image; and providing at least the plurality of histograms or data generated based on the plurality of histograms as input to the first ML model.

8. The computer-implemented method of claim 6, further comprising:

obtaining a second document image that includes a second representation of a second document;

determining, via use of at least the second document image and the first ML model, that the second document image was generated by a second type of capture device; and executing a second rectifying pipeline for the second document image selected based at least in part on having determined the second document image was generated by the second type of capture device, wherein the second rectifying pipeline is different than the rectifying pipeline.

9. The computer-implemented method of claim 8, wherein executing the second rectifying pipeline includes at least:

generating a plurality of gradients based at least in part on the second document image;

determining a maximum agreement angle based at least in part on two or more of the plurality of gradients; and performing a rotation operation based at least in part on the maximum agreement angle.

10. The computer-implemented method of claim 4, further comprising transmitting at least one of the rectified document image or the homography information to a storage service of a provider network or to another computing instance of a document processing service of the provider network.

11. The computer-implemented method of claim 10, further comprising:

performing one or more optical character recognition (OCR) processes, using at least the another computing instance and the rectified document image, to identify at least some text depicted within the document; and transmitting the text to a device outside of the provider network.

12. The computer-implemented method of claim 11, further comprising:

transmitting data to the device to cause the device to display the original representation of the document with at least one overlaid bounding region based on at least some of the homography information.

13. The computer-implemented method of claim 4, wherein generating the plurality of locations comprises:

providing the document image or a transformed version of the document image as input to the second ML model, wherein the second ML model generates at least four output channels, each indicating a corresponding one of the plurality of corner locations of the document within the document image.

14. The computer-implemented method of claim 13, wherein:

the second ML model comprises a neural network; and the transformed version of the document image is used to provide input to the second ML model, wherein the transformed version of the document image has a smaller resolution in at least one dimension than the corresponding one or more dimensions of the modified document image.

15. A system comprising:

a storage service implemented by a first one or more electronic devices within a provider network; and a document processing service implemented by a second one or more electronic devices within the provider network, the document processing service including instructions that upon execution cause the document processing service to:

obtain, from the storage service, a document image that includes a representation of a document;

select, via use of the document image and a first machine learning (ML) model, a rectifying pipeline from a plurality of rectifying pipelines for use to rectify the document image, wherein the selection includes:

providing histogram information from one or more channels of the document image as input to the first ML model; and predicting, using the first ML model, a type of capture device that generated the document image; and execute the selected rectifying pipeline, wherein the document processing service is to:

generate, using at least the document image and a second machine learning (ML) model, a plurality of locations corresponding to a plurality of corners of the document within the document image;

determine, based at least in part on the plurality of locations, homography information associated with the document image;

modify the document image based at least in part on the homography information to yield a modified document image;

determine, using at least the modified document image and a third ML model, an orientation of the document as represented within the modified document image; and reorient the modified document image based at least in part on the orientation to yield a rectified document image.

16. The system of claim 15, wherein the predicted type of capture device that generated the document image is a mobile electronic device.

17. The system of claim 16, wherein to select the rectifying pipeline the document processing service is to:

generate a plurality of histograms for a corresponding plurality of channels of the document image; and provide at least the plurality of histograms or data generated based on the plurality of histograms as input to the third ML model.

18. The system of claim 16, wherein the instructions upon execution further cause the document processing service to:

obtain a second document image that includes a second representation of a second document;

determine, via use of at least the second document image and the first ML model, that the second document image was generated by a second type of capture device; and initiate an execution of a second rectifying pipeline for the second document image selected based at least in part on having determined the second document image was generated by the second type of capture device, wherein the second rectifying pipeline is different than the rectifying pipeline.

19. The system of claim 18, wherein to execute the second rectifying pipeline the instructions upon execution further cause the document processing service to at least:

generate a plurality of gradients based at least in part on the second document image;

determine a maximum agreement angle based at least in part on the plurality of gradients; and perform a rotation operation based at least in part on the maximum agreement angle.

20. The system of claim 15, wherein the instructions upon execution further cause the document processing service to:

transmit the rectified document image and the homography information to another computing instance of the document processing service;

perform, at least partially by the another computing instance, one or more optical character recognition (OCR) processes using the rectified document image, to identify at least some text depicted within the document; and transmit, to a device outside of the provider network, data comprising at least the text causing the device to display the original representation of the document with at least one overlaid bounding region based on at least some of the homography information.

* * * * *